(12) United States Patent
Luo

(10) Patent No.: US 11,584,319 B2
(45) Date of Patent: Feb. 21, 2023

(54) VEHICLE BUMPER WITH STORAGE ARRANGEMENT

(71) Applicant: Xing Wen Luo, City of Industry (UA)

(72) Inventor: Xing Wen Luo, City of Industry (UA)

( * ) Notice: Subject to any disclaimer, the term of this patent is extended or adjusted under 35 U.S.C. 154(b) by 0 days.

(21) Appl. No.: 17/213,151

(22) Filed: Mar. 25, 2021

(65) Prior Publication Data
US 2022/0250568 A1    Aug. 11, 2022

(51) Int. Cl.
B60R 19/48    (2006.01)
(52) U.S. Cl.
CPC .................................. B60R 19/48 (2013.01)
(58) Field of Classification Search
CPC ........................ B60R 19/48; B60R 2011/004
USPC ....................................................... 293/106
See application file for complete search history.

(56) References Cited

U.S. PATENT DOCUMENTS

| | | | | |
|---|---|---|---|---|
| 1,369,636 A * | 2/1921 | Dwork | .................. | B60R 19/023 224/489 |
| 2,993,721 A * | 7/1961 | Bowman | ................ | B60R 19/48 293/106 |
| 3,471,070 A * | 10/1969 | Olson | ..................... | B60R 9/065 280/505 |
| 3,501,190 A * | 3/1970 | McCrea | ..................... | B60R 3/02 224/489 |
| 3,614,136 A * | 10/1971 | Dent | ....................... | B60R 19/48 220/255 |
| 4,570,986 A * | 2/1986 | Sams | ...................... | B60R 11/06 224/489 |
| 4,674,782 A * | 6/1987 | Helber | .................... | B60R 9/065 224/489 |
| 4,676,415 A * | 6/1987 | Kennedy | ................ | B60R 19/48 414/466 |
| 4,893,856 A * | 1/1990 | Council | .................. | B60R 19/48 293/106 |
| 4,993,610 A * | 2/1991 | Abretske | ............... | B62D 43/02 293/106 |
| 5,016,932 A * | 5/1991 | Carter | .................... | B60R 19/48 224/489 |
| 5,135,274 A * | 8/1992 | Dodd | ..................... | B60R 19/48 414/466 |
| 5,364,142 A * | 11/1994 | Coiner | ................... | B60R 19/48 293/106 |
| 5,823,585 A * | 10/1998 | Tanguay | ................ | B60R 19/48 293/106 |
| 5,979,953 A * | 11/1999 | Rinehart | ............... | B60R 19/48 293/106 |

(Continued)

*Primary Examiner* — Jason S Morrow
*Assistant Examiner* — Wenwei Zhuo
(74) *Attorney, Agent, or Firm* — Raymond Y. Chan; David and Raymond Patent Firm

(57) ABSTRACT

A vehicle bumper for a vehicle includes a bumper frame adapted for installing into one of a front end and a rear end of a vehicle to absorb impact in case of collision, and a function unit provided at the bumper frame. The function unit is incorporated with the bumper frame to form at least one of a flip type storage container, a drawer storage container and a detachable storage container for providing an additional storage to the vehicle, wherein the flip type storage container, the drawer storage container and the detachable storage container are located at different locations of the bumper frame, such that the flip type storage container, the drawer storage container and the detachable storage container are individually operated.

5 Claims, 22 Drawing Sheets

(56) References Cited

U.S. PATENT DOCUMENTS

| | | | |
|---|---|---|---|
| 6,598,914 B1* | 7/2003 | Dixon | B60R 15/02 |
| | | | 296/180.1 |
| 8,356,852 B2* | 1/2013 | Lucas | B60R 13/105 |
| | | | 293/118 |
| 2005/0140159 A1* | 6/2005 | Barber | B60R 11/00 |
| | | | 296/37.6 |
| 2012/0043773 A1* | 2/2012 | Lucas | B60L 50/66 |
| | | | 293/106 |
| 2014/0008460 A1* | 1/2014 | Massaro | B60S 1/56 |
| | | | 239/284.2 |
| 2016/0114748 A1* | 4/2016 | Hare | B60R 19/023 |
| | | | 293/106 |
| 2016/0121832 A1* | 5/2016 | Hare | B60R 19/48 |
| | | | 293/106 |
| 2018/0072254 A1* | 3/2018 | Wymore | B60R 11/06 |
| 2020/0353872 A1* | 11/2020 | Keck | B60P 1/43 |
| 2022/0144345 A1* | 5/2022 | Luo | B60R 9/02 |

* cited by examiner

VEHICLE BUMPER WITH STORAGE ARRANGEMENT

CROSS REFERENCE OF RELATED APPLICATION

This application is a non-provisional application that claims the benefit of priority under 35 U.S.C. § 119 to a Chinese application number CN202110162590.8, filed Feb. 5, 2021, which is incorporated herewith by reference in its entirety.

BACKGROUND OF THE PRESENT INVENTION

Field of Invention

The present invention relates to bumper, and more particularly to a vehicle bumper with storage arrangement, which is adapted to install into a vehicle for not only serving as a bumper frame to absorb impact in case of collision but also providing desired function such as easy accessible storages.

Description of Related Arts

Automobiles, such as sedans and coupes, are considered as a passenger car that transports people with limited cargo space. Nowadays, people like the space and like sitting up high for better visibility when driving. Therefore, utility vehicles, such as trucks, cargo van, or sport utility vehicles (SUV), that transport both people, goods, tools, cargo, and the like, are becoming so popular and are bigger and taller than normal passenger automobiles so as to provide more cargo space of the vehicle. However, the cargo to be carried may exceed the available cargo space of the vehicle. For outdoor recreational activities, such as hunting or camping, as an example, tents, sleeping bags, chairs, water containers, and other bulky items are often carried in the limited cargo space of the vehicle. It is desirable to provide various areas for temporary storage of items. Vehicle manufacturers offer many different types of exterior storage devices installed into the vehicle.

A first common storage arrangement is a roof rack installed on a roof of the vehicle. The bulky or heavy cargo, such as luggage, skis and bicycle, can be fastened at the roof rack on top of the vehicle. However, this roof rack is designed to carry only specific types of larger object. In addition, even though this roof rack can well serve for storing items, it is difficult for the driver to reach the roof rack for loading and unloading the items at the roof rack anytime or anywhere for some handy items. The driver is required to climb up the roof of the vehicle to access the items carried or fasten the items thereon.

A second common storage arrangement is a rear storage device installed at the rear end of the vehicle. Accordingly, an attachment or adapter is required for installing the rear storage device to the vehicle, wherein such attachment is not designed to support substantial loads. Generally, the rear storage device is mostly used to carry spare tire. In other words, the heavy items are not suggested to be loaded in the rear storage device. Since the rear storage device is installed at the rear end of the vehicle behind the cargo space thereof, the rear storage device may block the access of the cargo space. Furthermore, the rear storage device is intended to permanently attach to the vehicle to enhance the rigid support of the rear storage. It is impractical and expensive to permanently install the rear storage device to limit the access of the cargo storage of the vehicle.

Generally, these vehicles are constructed to have a front bumper and a rear bumper installed at a front end and a rear end of the vehicle. It is to the provision of the vehicle to enhance the storage ability thereof by modifying spatial positions at the front and/or rear bumpers so as to provide additional functions thereof.

SUMMARY OF THE PRESENT INVENTION

The invention is advantageous in that it provides a vehicle bumper with an arrangement for storage or other utility functions, which is adapted to install into a front end or a rear end of the vehicle for not only serving as a bumper frame to absorb impact in case of collision but also providing desired function such as easy accessible storages.

Another advantage of the invention is to provide a vehicle bumper with an arrangement for storage or other utility functions, which provides additional storage space without reducing any cargo space of the vehicle and at the same time enhances the strength of the vehicle bumper.

Another advantage of the invention is to provide a vehicle bumper with a storage arrangement for storage or other utility functions, wherein the storage arrangement can be provided at any desired location of the vehicle bumper according to the need of the user.

Another advantage of the invention is to provide a vehicle bumper with a storage arrangement for storage or other utility functions, which provides multi-functions without affecting the original vehicle frame or cargo space.

Another advantage of the invention is to provide a vehicle bumper with storage arrangement, which provides different storage sizes for storing different sizes of objects, such as tools, bags, luggage, etc.

Another advantage of the invention is to provide a vehicle bumper with a storage arrangement for storage or other utility functions, which does not require altering the original structural design of the vehicle, so as to minimize the manufacturing cost of the vehicle that incorporates the vehicle bumper and to keep the aesthetic appearance of the vehicle.

Another advantage of the invention is to provide a vehicle bumper with a storage arrangement for storage or other utility functions, wherein the vehicle bumper can serve as a front bumper to detachably couple at the front end of the vehicle or as a rear bumper to detachably couple at the rear end of the vehicle.

Another advantage of the invention is to provide a vehicle bumper with storage arrangement for storage or other utility functions, wherein the installation of the vehicle bumper is quick and easy by simply removing the original vehicle bumper from the vehicle and coupling the vehicle bumper of the present invention to the vehicle via the original bumper connectors.

Another advantage of the invention is to provide a vehicle bumper with a storage arrangement for storage or other utility functions, wherein the vehicle bumper can be directly coupled to the original vehicle bumper to simplify the installation step of removing the original vehicle bumper from the vehicle.

Another advantage of the invention is to provide a vehicle bumper with a storage arrangement for storage or other utility functions, wherein no expensive or complicated structure is required to employ the present invention in order to achieve the above mentioned objectives. Therefore, the present invention successfully provides an economic and efficient solution to provide a safety means for rapidly and securely coupling the vehicle bumper to the vehicle and to create additional functions such as storage without affecting the cargo space of the vehicle.

Additional advantages and features of the invention will become apparent from the description which follows and may be realized by means of the instrumentalities and combinations particular point out in the appended claims.

According to the present invention, the foregoing and other objects and advantages are attained by a vehicle bumper for a vehicle, comprising:

a bumper frame adapted for installing into one of a front end and a rear end of a vehicle to absorb impact in case of collision, wherein the bumper frame has a left frame portion, a right frame portion, a mid-frame portion, and at least one storage space formed with at least one of the left frame portion, the right frame portion and the mid-frame portion to provide a storage of said bumper frame; and at least a function unit provided at the bumper frame and incorporated with the storage unit to form a storage container for providing an additional storage to the vehicle.

Accordingly, the function unit is incorporated with the bumper frame to form at least one of a flip type storage container, a drawer storage container and a detachable storage container for providing an additional storage to the vehicle, wherein the flip type storage container, the drawer storage container and the detachable storage container are located at different locations of the bumper frame, such that the flip type storage container, the drawer storage container and the detachable storage container are individually operated.

In accordance with another aspect of the invention, the present invention comprises a method for manufacturing a vehicle bumper for a vehicle, which comprises the following steps.

(A) Provide a bumper frame for installing into one of a front end and a rear end of a vehicle to absorb impact in case of collision, wherein the bumper frame has a storage space.

(B) Provide a function unit at the bumper frame, wherein the function unit is incorporated with the storage space of the bumper frame to form at least one of a flip type storage container, a drawer storage container and a detachable storage container for providing an additional storage to the vehicle, wherein the flip type storage container, the drawer storage container and the detachable storage container are located at different locations of the bumper frame, such that the flip type storage container, the drawer storage container and the detachable storage container are individually operated.

In accordance with another aspect of the invention, the present invention comprises a method for installing a vehicle bumper to a vehicle, which comprises the following steps.

(1) Remove an original vehicle bumper from the vehicle by unfastening bumper connectors from the original vehicle bumper.

(2) Attach the vehicle bumper to the vehicle via the bumper connectors.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
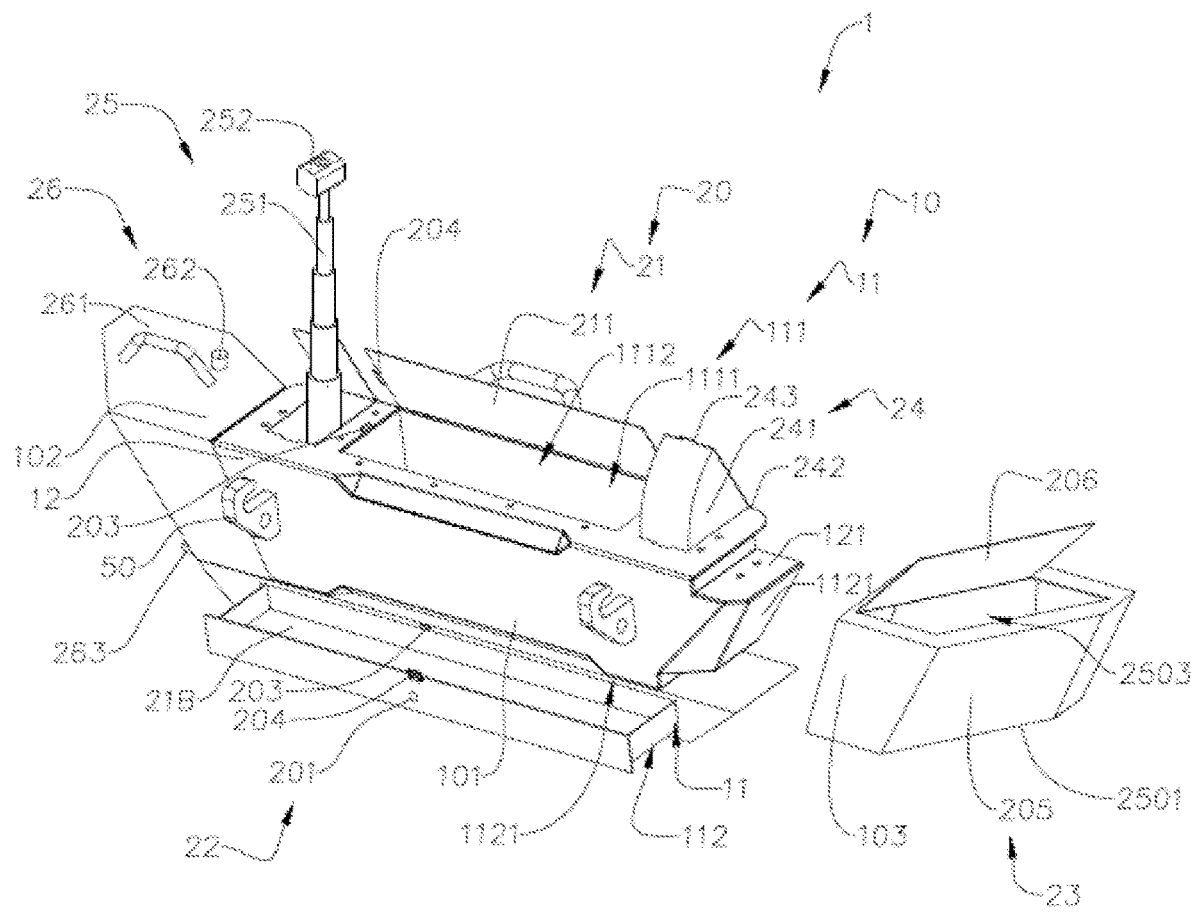
FIG. 1A is a perspective view of a vehicle bumper for a vehicle according to a preferred embodiment of the present invention.
Figure 1B:
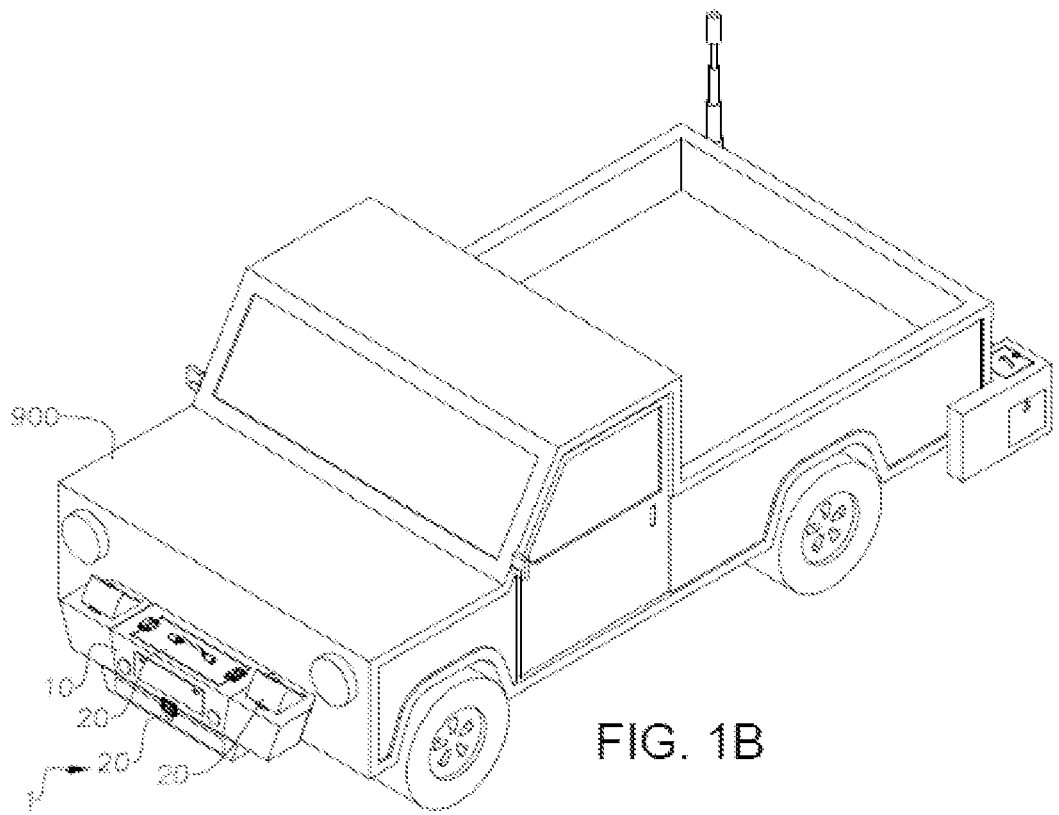
FIG. 1B is a perspective view of the vehicle bumper installed into a front end of the vehicle as an example according to the preferred embodiment of the present invention.
Figure 1C:
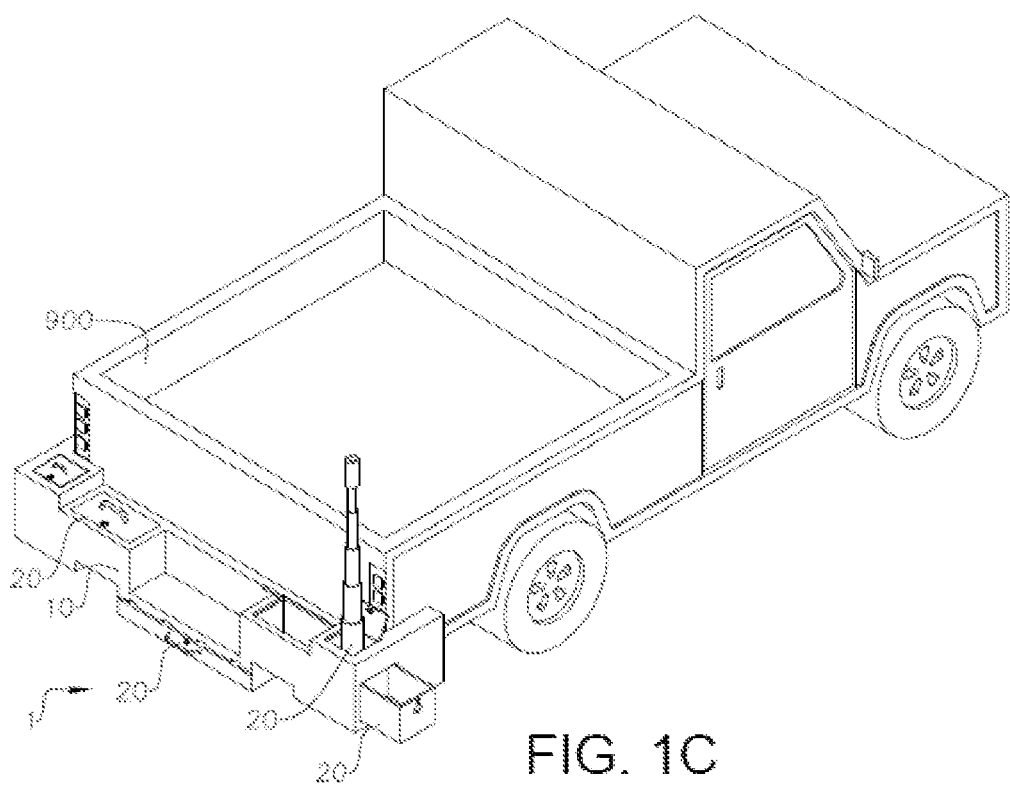
FIG. 1C is a perspective view of the vehicle bumper installed into a rear end of the vehicle as another example according to the preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "interior" and "exterior" and in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIGS. 1A to 22 of the drawings, a vehicle bumper 1 for a vehicle 900 according to a preferred embodiment of the present invention is illustrated, wherein the vehicle bumper 1 is adapted for installing into the vehicle 900 for absorbing impact in case of collision, providing desired functions and creating easily accessible storages. Particularly, the vehicle bumper 1 is arranged for installing into at least one of a front end and a rear end of the vehicle 900 for absorbing impact. For example, the vehicle bumper 1 of the present invention serves as a front bumper of the vehicle 900 by removing the existing front bumper from the front end of the vehicle 900 and coupling the vehicle bumper 1 of the present invention to the front end of the vehicle 900. Likewise, the vehicle bumper 1 of the present invention serves as a rear bumper of the vehicle 900 by removing the existing rear bumper from the rear end of the vehicle 900 and coupling the vehicle bumper 1 of the present invention to the rear end of the vehicle 900.

According to the preferred embodiment, the vehicle bumper 1 comprises a bumper frame 10 and at least a function unit 20. The bumper frame 10 is configured for detachably attaching to the front end and/or the rear end of the vehicle 900, wherein the bumper frame 10 is transversely supported at the vehicle 900. The bumper frame 10 has a mid-frame portion 101, a left frame portion 102 and a right frame portion 103, wherein the right frame portion 103 and the left frame portion 102 are sidewardly and transversely extended from two sides of the mid-frame portion 101 respectively to form an elongated structure. The bumper frame 10 further has at least a storage space 11 formed with at least one of the left frame portion 102, the right frame portion 103 and the mid-frame portion 101 to provide a storage of the bumper frame 10. The function unit 20 is provided at the bumper frame 10 and is incorporated with the storage space 11 for adding a predetermined function to the vehicle 900.

Accordingly, the storage space 11 is constructed by a storage unit 111 formed at the bumper frame 10, wherein the storage unit 111 has a storage compartment 1111 and compartment opening 1112 for receiving one or more objects in the storage compartment 1111 through the compartment opening 1112.

The bumper frame 10 further comprises a bumper body 12 and defines one or more installation locations 13 at the bumper body 12. Accordingly, the installation location 13 can be defined on at least one of a mid-portion of the bumper body 12, one of two side portions of the bumper body 12, and a portion between the side portion and the mid-portion of the bumper body 12. The function unit 20 is installed into the installation portion 13 of the bumper frame 10. Therefore, after the function unit 20 is installed into the installation portion 13 of the bumper frame 10, the bumper frame 10 will provide the desired function, such as adding the storage space 11 at the bumper frame 10.

It is worth mentioning that the function unit 20 can be implemented as a storage container or a functional component. The storage container can be embodied as a tool box, a liquid container, or a thermal container. Particularly, the storage container can be in form of a flip type storage container 21, a drawer storage container 22, and a detachable storage container 23. In other words, the function unit 20 is incorporated with the bumper frame 10 to form at least one of one flip type storage container 21, one drawer storage container 22 and one detachable storage container 23 for providing an additional storage to the vehicle. The functional component can be implemented as a light module 24, a frame support 25 or the like.

As the storage container is embodied as the flip type storage container 21, the function unit 20 comprises a cover panel 211 coupled at the storage unit 111 at the compartment opening 1112 to selectively enclose the storage compartment 1111. Preferably, the cover panel 211 is pivotally coupled at the storage unit 111 to pivotally move between an opened position. In one embodiment, the compartment opening 1112 is embodied as a top opening of the storage compartment 1111, wherein the compartment opening 1112 is formed at a top surface of the bumper frame 10, such that the storage compartment 1111 is downwardly indented from the top surface of the bumper frame 10. The cover panel 211 is pivotally coupled at an edge of the compartment opening 1112. The cover panel 211 is pivotally and upwardly folded at its opened position to open up the storage compartment 1112. The cover panel 211 is pivotally and downwardly folded at its closed position to enclose the storage compartment 1112.

As the storage container is embodied as the drawer storage container 22, the storage space 11 is constructed to have a drawer compartment 112 with a drawer opening 1121. In one embodiment, the drawer opening 1121 is embodied as a front opening of the drawer compartment 112, wherein the drawer opening 1121 is formed at a front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

As the storage container is embodied as the detachable storage container 23, the detachable storage container 23 is detachably coupled at the bumper frame 10. Particularly, the bumper frame 10 has one or more installation portions 121, wherein the detachable storage container 23 is detachably coupled at the installation portion 121 of the bumper frame 10. It is worth mentioning that when the detachable storage container 23 is coupled at the installation portion 121 of the bumper frame 10, the detachable storage container 23 forms as a part of the bumper frame 10, such that the detachable storage container 23 also serves as the bumper frame 10 for absorbing impact.

It is worth mentioning that the flip type storage container 21, the drawer storage container 22, and the detachable storage container 23 can be formed at the same time. In one example, the flip type storage container 21 and the drawer storage container 22 are formed at the mid-frame portion 101 of the bumper frame 10, wherein the flip type storage container 21 is located above the drawer storage container 22. The flip type storage container 21 is actuated at the top surface of the mid-frame portion 101 of the bumper frame 10 while the drawer storage container 22 is actuated at the front surface of the mid-frame portion 101 of the bumper frame 10. Two detachable storage containers 23 are detachably coupled at the left frame portion 102 and the right frame portion 103 of the bumper frame 10 respectively. It is worth mentioning that the detachable storage containers 23 are detachably coupled at the left frame portion 102 and the right frame portion 103 of the bumper frame 10 respectively to form an extended bumper structure. In other words, since the flip type storage container 21, the drawer storage container 22 and the detachable storage container 23 are located at different locations of the bumper frame 10, the flip type storage container 21, the drawer storage container 22 and the detachable storage container 23 are individually operated.

As shown in FIGS. 1A, 2A, 2B and 2C, the flip type storage container 21 is constructed to have the cover panel 211 with a handle member 201, wherein the cover panel 211 is pivotally moved via the handle member 201 to selectively open up the storage compartment 111. Accordingly, the handle member 201 is embodied as a cover handle when the handle member 201 is coupled at the cover panel 211. It is worth mentioning that the storage unit 11 is integrally formed with the bumper frame 10, wherein the storage compartment 111 is built-in with the bumper frame 10, such that the cover panel 211 is pivotally coupled at the bumper frame 10 at the compartment opening 1112 to selectively enclose the storage compartment 111. Particularly, the cover panel 211 is pivotally coupled at the storage unit 11 via a pivot hinge 202 at the compartment opening 1112 to selectively enclose the storage compartment 111.

It is worth mentioning that the cover panel 211 can be detachably coupled at the storage unit 11 via a lock assembly. In other words, at the closed position, the cover panel 211 is coupled at the storage unit 11 at the compartment opening 1112 to enclose the storage compartment 111. At the opened position, the cover panel 211 is detached from the storage unit 11 at the compartment opening 1112 to open up the storage compartment 111. The lock assembly is configured to lock the cover panel 211 at the closed position.

The flip type storage container 21 further comprises a first locker 203 provided at the bumper frame 10 and a second locker 204 provided at the cover panel 211, wherein when the second locker 204 is releasably locked with the first locker 203, the cover panel 211 is locked at the closed position and is locked at the bumper body 12 to enclose the storage compartment 111. Once the second locker 204 is unlocked from the first locker 203, the cover panel 211 is adapted to be pivotally and upwardly folded to the opened position so as to open up the storage compartment 111. It is worth mentioning that the first and second lockers 203, 204 can be formed as a key locking assembly, wherein a corresponding key is configured to unlock the locking engagement between the first and second lockers 203, 204. Likewise, the first and second lockers 203, 204 can be formed as a numeric locking assembly, a preset built-in lock code is configured to unlock the locking engagement between the first and second lockers 203, 204.

Figure 2A:
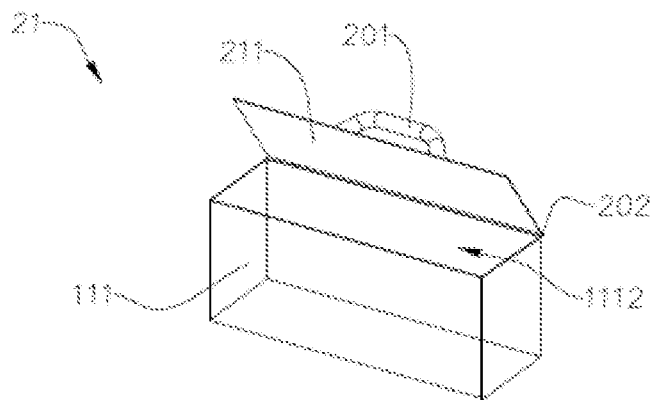
FIGS. 2A to 2C are perspective views of a storage unit of the vehicle bumper according to the preferred embodiment of the present invention, illustrating the storage unit constructed with a storage compartment with a foldable cover panel.
Figure 2B:
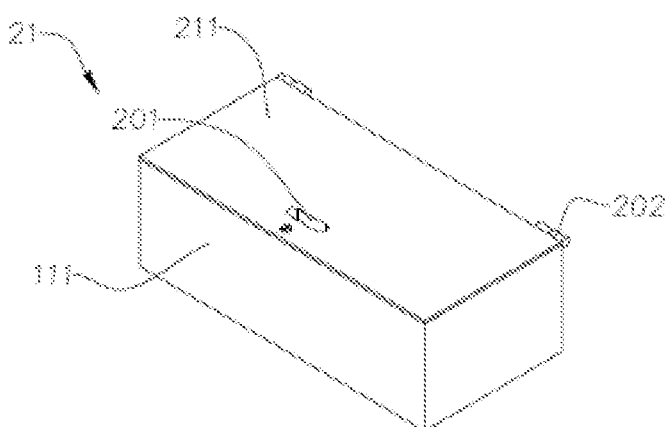
Figure 2C:
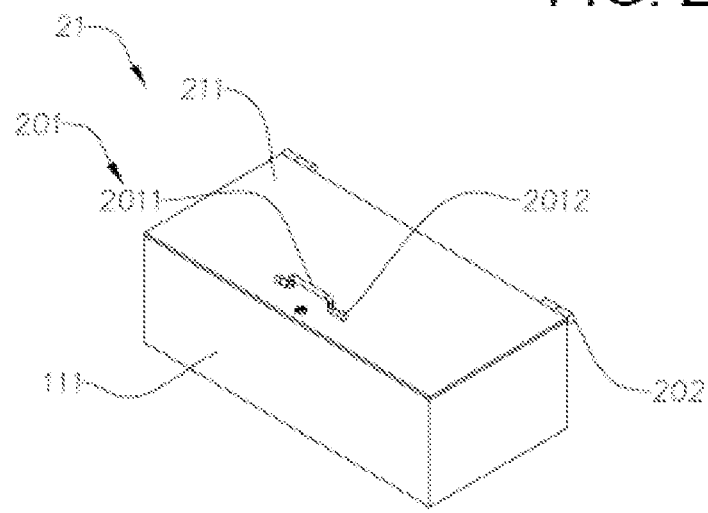

FIGS. 2A to 2C illustrate different configurations of the handle member 201 formed at a top surface of the cover panel 201. As shown in FIG. 2A, the handle member 201 has a U-shaped bar configuration, wherein two ends of the handle member 201 are affixed at the top surface of the cover panel 201. It is worth mentioning that the U-shaped handle member 201 also serves as a supplement bumper structure to reinforce the strength of the bumper frame 10. As shown in FIG. 2B, the handle member 201 is a hidden type handle 201, wherein the handle member 201 forms as a handle slot indented on the top surface of the cover panel 201 at an opposed edge portion of the pivot hinge 202. Since the handle member 201 is not protruded from the cover panel 201, the bumper frame 10 can keep its aesthetic appearance. As shown in FIG. 2C, the handle member 201 is movably coupled at the top surface of the cover panel 201. The handle member 201 comprises two handle hinges 2012 spacedly coupled at the top surface of the cover panel 201, and a handle bar 2011 having two end portions rotatably coupled at the handle hinges 2012 respectively. Therefore, the handle member 201 is rotatably coupled at the top surface of the cover panel 201. The handle member 201 is rotatably and downwardly folded flat on the top surface of the cover panel 201. When the handle member 201 is rotatably and upwardly folded on the top surface of the cover panel 201 to perpendicularly extend therefrom, the handle member 201 can be held and actuated to pivotally lift up the cover panel 201 for opening up the storage compartment 111.

Figure 3A:
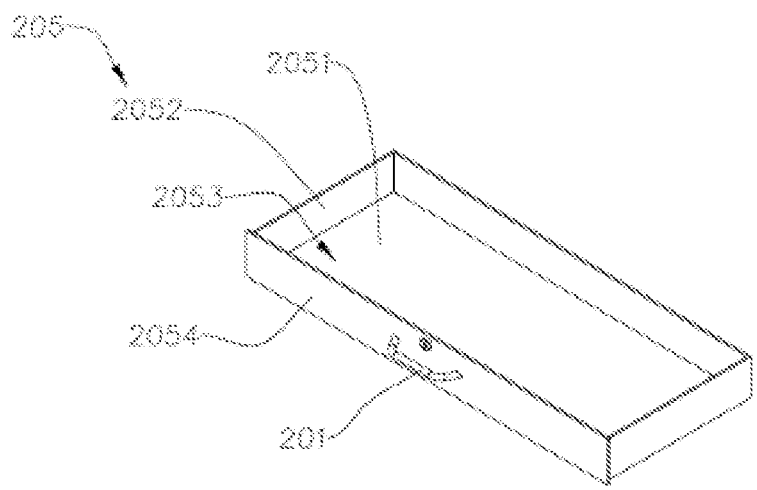
FIGS. 3A to 3C are perspective views of a storage unit of the vehicle bumper according to the preferred embodiment of the present invention, illustrating the storage unit constructed with a drawer.
Figure 3B:
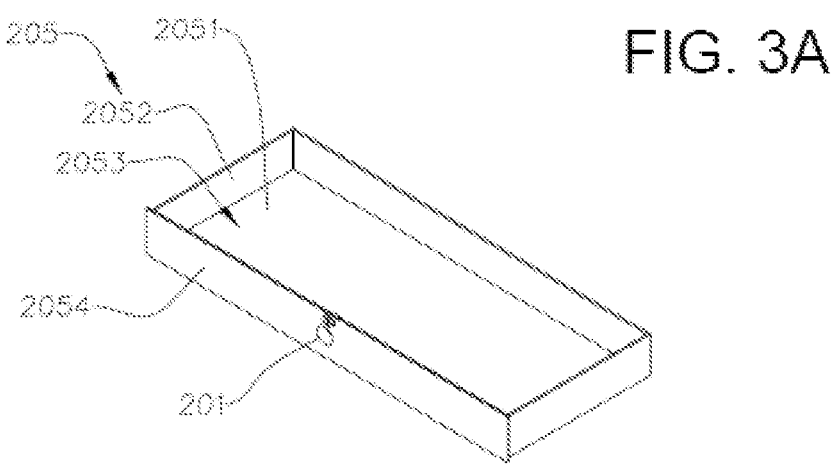

As shown in FIG. 1A and FIGS. 3A to 3B, the drawer storage container 22 is constructed to have the drawer body 205 with the handle member 201 coupled thereto. Accordingly, the handle member 201 is embodied as a drawer handle when the handle member 201 is coupled at the drawer body 205. The drawer body 205 is slidably received in the storage space 11. The drawer body 205 is slid out from the storage space 11 to open up a drawer storage space of the drawer body 205. The drawer body 205 is slid into the storage space 11 to enclose the drawer storage space of the drawer body 205. Accordingly, the drawer body 205 is constructed by a drawer bottom wall 2051, a drawer surrounding wall 2052 and a drawer panel wall 2054, wherein the drawer surrounding wall 2052 and the drawer panel wall 2054 are upwardly extended from edges of the drawer bottom wall 2051 to define the drawer storage space with a drawer opening space 2053. In other words, the drawer opening space 2035 is a top opening space defined at top edges of the drawer surrounding wall 2052 and the drawer panel wall 2054, such that an object is able to be placed in the drawer storage space through the drawer opening space 2053 and to be supported on the drawer bottom wall 2051. The handle member 201 is coupled at the drawer panel wall 2054, wherein the drawer panel wall 2054 is embodied as a front panel wall of the drawer body 205. When the drawer body 205 is slid to receive in the storage space 11, the drawer panel wall 2054 is aligned with the front surface of the bumper frame 10 at the same planar manner, so as to maintain the aesthetic appearance of the bumper frame 10 incorporating with the drawer body 205. Another set of the first and second lockers 203B, 204B are incorporated with the drawer storage container 22. Accordingly, the first locker 203B is provided at the bumper frame 10 while the second locker 204B is provided at the drawer panel wall 2054. When the drawer body 205 is slid to receive in the storage space 11, the second locker 204B is arranged to lock with the first locker 203B in order to lock the drawer body 205 in the storage space 11 to lock the drawer body 205 at the closed position. When the second locker 204B is unlocked with the first locker 203B, the drawer body 205 is able to slid out from the storage space 11 at the opened position. Likewise, the first and second lockers 203B, 204B can be formed as a key locking assembly, wherein a corresponding key is configured to unlock the locking engagement between the first and second lockers 203B, 204B. Alternatively, the first and second lockers 203B, 204B can be formed as a numeric locking assembly, a preset built-in lock code is configured to unlock the locking engagement between the first and second lockers 203B, 204B.

Figure 3C:
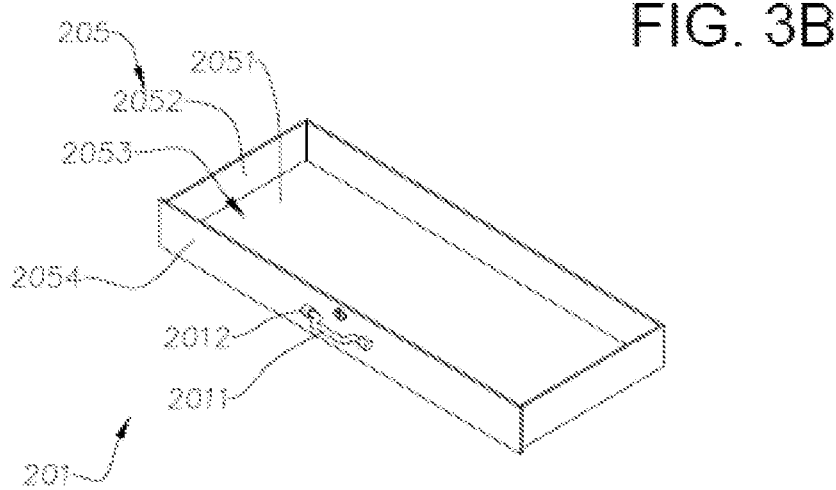

FIGS. 3A to 3C illustrate different configurations of the handle member 201 formed at a front surface of the drawer panel wall 2054. As shown in FIG. 3A, the handle member 201 has a U-shaped bar configuration, wherein two ends of the handle member 201 are affixed at the front surface of the drawer panel wall 2054 of the drawer body 205. It is worth mentioning that the U-shaped handle member 201 also serves as a supplement bumper structure to reinforce the strength of the bumper frame 10. As shown in FIG. 3B, the handle member 201 is a hidden type handle 201, wherein the handle member 201 forms as a handle slot indented on the front surface of the drawer panel wall 2054. Since the handle member 201 is not protruded from the drawer panel wall 2054 or the bumper frame 10, the bumper frame 10 can keep its aesthetic appearance. As shown in FIG. 3C, the handle member 201 is movably coupled at the front surface of the drawer panel wall 2054. The handle member 201 comprises two handle hinges 2012 spacedly coupled at the front surface of the drawer panel wall 2054, and a handle bar 2011 having two end portions rotatably coupled at the handle hinges 2012 respectively. Therefore, the handle member 201 is rotatably coupled at the front surface of the drawer panel wall 2054. The handle member 201 is rotatably folded flat on the front surface of the drawer panel wall 2054. When the handle member 201 is rotatably folded on the front surface of the drawer panel wall 2054 to perpendicularly extend therefrom, the handle member 201 can be held and actuated to slide out the drawer body 205 for opening up the drawer storage space thereof.

Figure 4A:
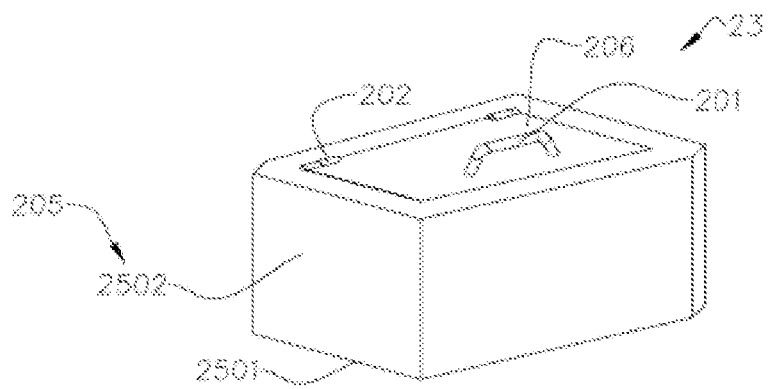
FIGS. 4A to 4C are perspective views of a storage unit of the vehicle bumper according to the preferred embodiment of the present invention, illustrating the storage unit constructed with a detachable storage.
Figure 4B:
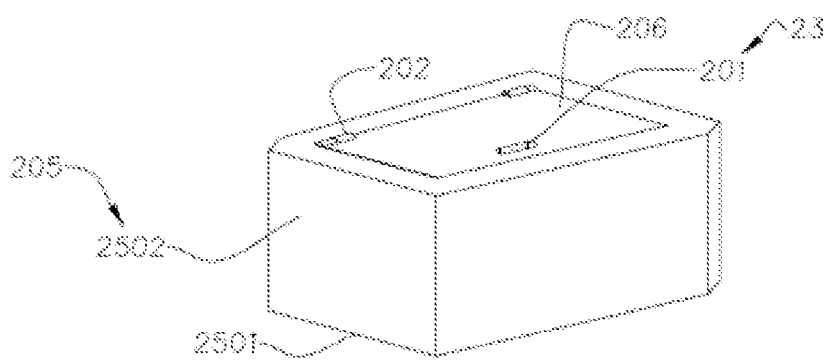

As shown in FIG. 1A and FIGS. 4A to 4B, the detachable storage container 23 is constructed to have the container body 205 with a foldable cover 206 detachably coupled thereto, wherein the detachable storage container 23 can be detachably coupled at the bumper frame 10 via a quick release connector. The quick release connector can be hook connectors, snap connectors, screws, or locks. Accordingly, the container body 205 is an individual container, wherein the container body 205 is constructed to have a container bottom wall 2051 and a container surrounding wall 2502 upwardly extended from edges of the container bottom wall 2051 to define a container storage space with a container opening space 2503. In other words, the container opening space 2503 is a top opening space defined at top edges of the container surrounding wall 2502, such that an object is able to be placed in the container storage space through the container opening space 2503 and to be supported on the container bottom wall 2501. The foldable cover 206 is foldably coupled at the container body 205 at the container opening space 2503. Particularly, the foldable cover 206 is pivotally coupled at the top edge of the container body 205 via the pivot hinge 202, such that the foldable cover 206 is pivotally and upwardly folded to open up the container storage space of the container body 205 and is pivotally and downwardly folded to enclose the container storage space of the container body 205. In other words, the structural configuration of the detachable storage container 23 is similar to that of the flip type storage container 21. For example, the foldable cover 206 is pivotally coupled at the top edge of the container body 205 via the pivot hinge 202 while the cover panel 211 is pivotally coupled at the top edge of the storage unit 111 via the pivot hinge 202. The difference is that the flip type storage container 21 is integrated with the bumper frame 10 while the detachable storage container 23 is detachably coupled at the bumper frame 10.

It is worth mentioning that the handle member 201 can be optionally provided at the detachable storage container 23. However, the detachable storage container 23 can keep its appearance when no handle member 201 is provided. The handle member 201 can be provided at the container surrounding wall 2502 and/or the foldable cover 206. When the handle member 201 is provided at the container surrounding wall 2502, the handle member 201 serves as a container handle to carry the detachable storage container 23 when the detachable storage container 23 is detached from the bumper frame 10. When the handle member 201 is provided at the foldable cover 206, the handle member 201 serves as a cover handle to operate the folding operation of the foldable cover 206 to selectively open and close the container body 206.

Figure 4C:
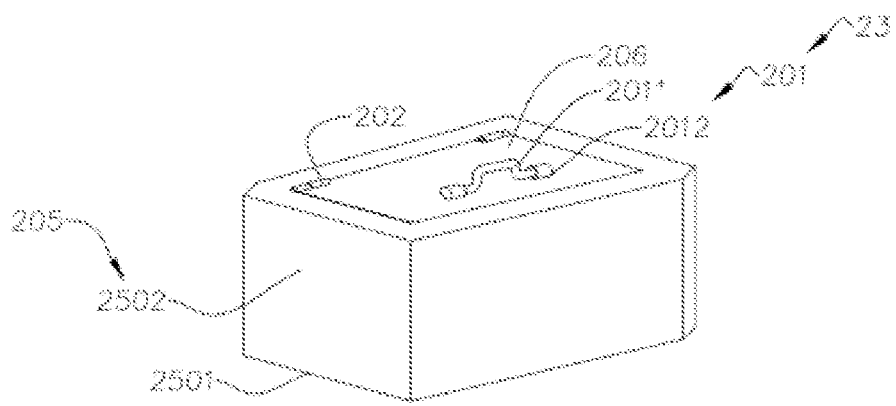

FIGS. 4A to 4C illustrate different configurations of the handle member 201 for the detachable storage container 23. As shown in FIG. 4A, the handle member 201 is affixed to the container surrounding wall 2502 and/or the foldable cover 206. Particularly, the handle member 201 has a U-shaped bar configuration, wherein two ends of the handle member 201 are affixed at the container surrounding wall 2502 and/or the foldable cover 206. Preferably, the handle member 201 is affixed at a top surface of the foldable cover 206 as shown in FIG. 4A. It is worth mentioning that the U-shaped handle member 201 also serves as a supplement bumper structure to reinforce the strength of the bumper frame 10.

As shown in FIG. 4B, the handle member 201 is a hidden type handle 201, wherein the handle member 201 forms as a handle slot indented on the container surrounding wall 2502 and/or the foldable cover 206. Preferably, the handle member 201 is indented on the top surface of the foldable cover 206 as shown in FIG. 4B. Since the handle member 201 is not protruded from the container surrounding wall 2502 and/or the foldable cover 206, the bumper frame 10 can keep its aesthetic appearance.

As shown in FIG. 4C, the handle member 201 is movably coupled at the container surrounding wall 2502 and/or the foldable cover 206. The handle member 201 comprises two handle hinges 2012 spacedly coupled at the container surrounding wall 2502 and/or the foldable cover 206, and a handle bar 2011 having two end portions rotatably coupled at the handle hinges 2012 respectively. For example, the handle member 201 is rotatably coupled at the top surface of the foldable cover 206. The handle member 201 can be rotatably folded flat on the top surface of the foldable cover 206. When the handle member 201 is rotatably folded on the top surface of the foldable cover 206 to perpendicularly extend therefrom, the handle member 201 can be held and actuated to operate the foldable cover 206 for opening up the drawer storage space thereof.

As shown in FIG. 1A, the light module 24 comprises a light fixture 241, an angle adjustment seat 242 and a light casing 243. The light fixture 241 is coupled at and supported on the angle adjustment seat 242, wherein a light projecting angle of the light fixture 241 is adjustable via the angle adjustment seat 242. The light casing 243 is foldably coupled at the angle adjustment seat 242, wherein the light fixture 241 is received in and protected by the light casing 243. Accordingly, the light casing 243 is unfolded from the angle adjustment seat 242 to expose the light fixture 241 when the light fixture 241 is operated. When the light fixture 241 is not in use, the light casing 243 is folded to the angle adjustment seat 242 to hide the light fixture 241. Accordingly, the light module 241 can be implemented as a lighting lamp, a camping lamp, a warning lamp, a day lighting lamp, an emergency lighting lamp, or a turn signal light. The light module 24 can be detachably coupled at the bumper frame 10 and can be electrically powered by a self power supply, such as battery, or by electrically connecting to a power source of the vehicle.

As shown in FIG. 1A, the frame support 25 comprises a retractable arm 251 upwardly extended from the bumper frame 10 and a functional device 252 supported at a top end of the retractable arm 251. Preferably, the retractable arm 251 is upwardly extended from the top surface of the mid-frame portion 101 of the bumper frame 10. When the retractable arm 251 is upwardly extended to prolong its length, the functional device 252 is lifted upward for supporting and/or hanging an object, such as a lamp, a parasol, an outdoor umbrella, an antenna, or a tent. When the retractable arm 251 is downwardly retracted to reduce its length, the functional device 252 is dropped downwardly to receive in the storage space 11. It is worth mentioning that when the frame support 25 is implemented as a light frame, a lighting device can be installed into the light frame. The lighting device can be implemented as a lighting lamp, a camping light, a warning light, a daytime lighting, an emergency lighting or a turn signal light.

As shown in FIG. 1A, the storage container is embodied as a liquid container 26, wherein the liquid container 26 comprises a sealing container 261, a liquid inlet 262 and a liquid outlet 263. The liquid inlet 262 is provided on a top side of the sealing container 261 for filling liquid, such as water or gasoline, into the sealing container 261. The liquid outlet 263 is provide at a bottom side of the sealing container 261 for dispensing the liquid from the sealing container 261. A sealable cap can be used for detachably coupling at each of the liquid inlet 262 and the liquid outlet 263 to seal thereat. It is appreciated that the liquid inlet 262 and the liquid outlet 263 can be integrated to form one single liquid opening, such that the liquid can be filled into the sealing container 261 and dispensed out of the sealing container 261 via the single liquid opening.

According to the preferred embodiment, the vehicle bumper 1 further comprises a tow assembly 50 provided at the bumper frame 10. It is worth mentioning that the tow assembly 50 is optional, wherein the tow assembly 50 can be incorporated with the function unit 20 at the bumper frame 10, such that their operations will not interfere with each other. Preferably, the tow assembly 50 comprises one or more towing hooks provided at the front surface of the bumper frame 10.

According to the preferred embodiment, there are different exemplifications of the bumper frame 10 and the function unit 20 to form the vehicle bumper 1 of the present invention.

Figure 5A:
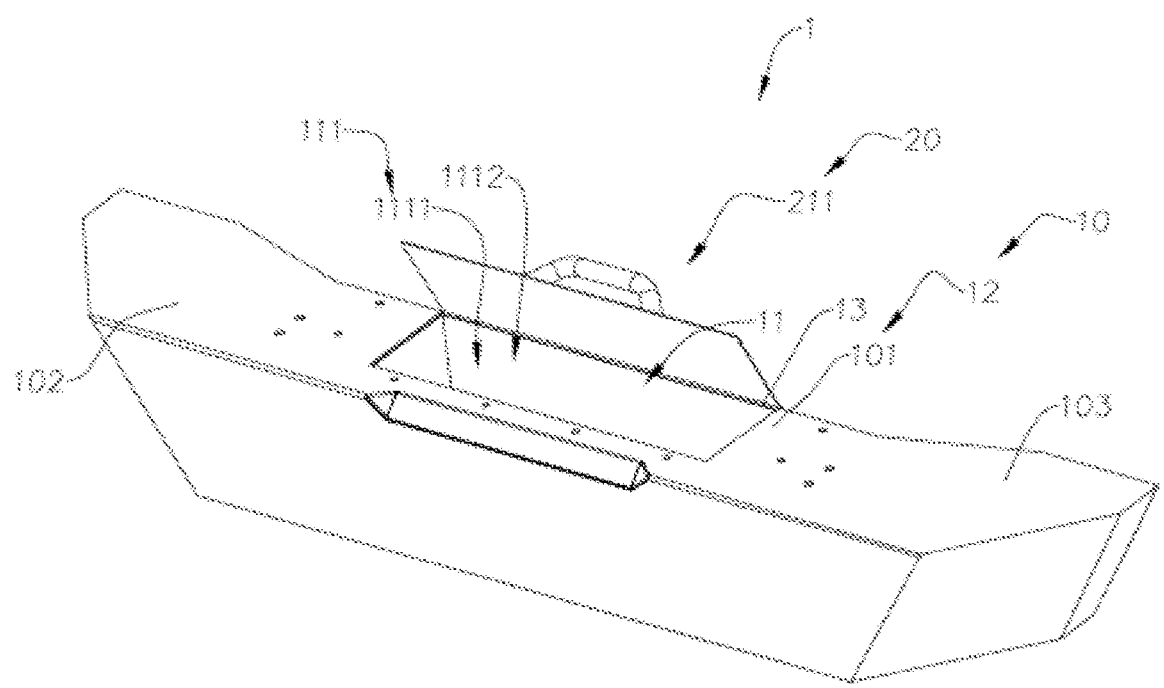
FIG. 5A illustrates a first exemplification of the vehicle bumper according to the preferred embodiment of the present invention.

FIG. 5A illustrates a first exemplification of the vehicle bumper 1 according to the preferred embodiment of the present invention. The storage space 11 is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface of the mid-frame portion 101 of the bumper frame 10 to form the storage compartment 1111. In other words, the installation location 13 is defined at the mid-frame portion 101 of the bumper frame 10, wherein the cover panel 211 is coupled at the storage unit 111 to form the flip type storage container 21.

Figure 5B:
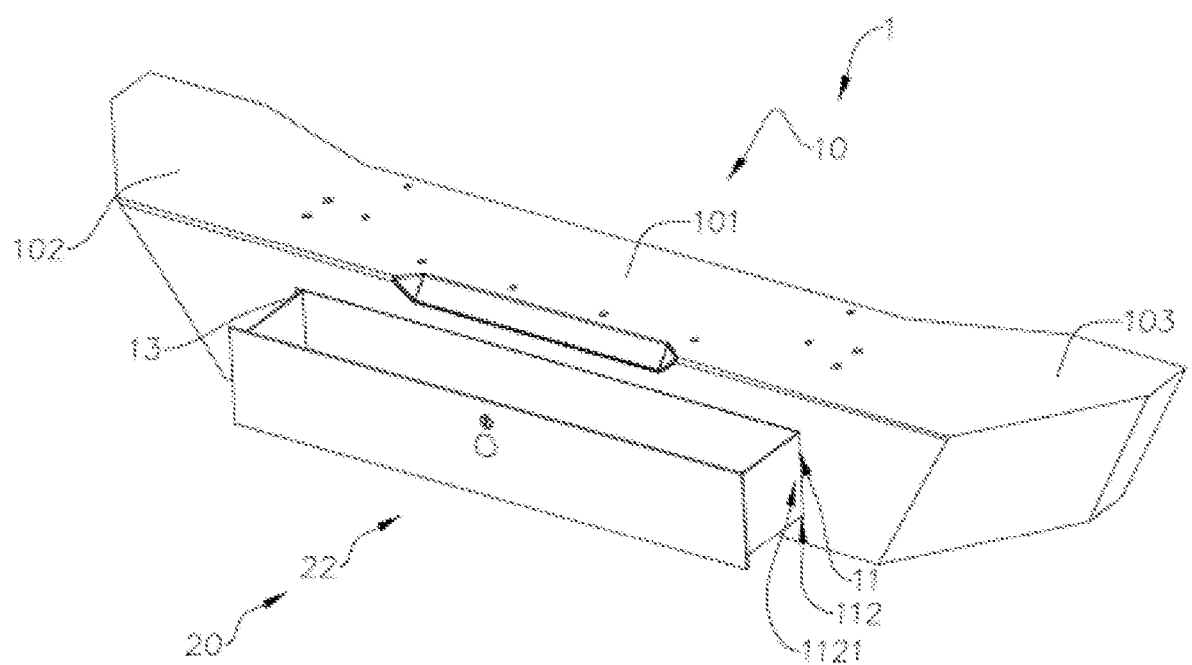
FIG. 5B illustrates a second exemplification of the vehicle bumper according to the preferred embodiment of the present invention.

FIG. 5B illustrates a second exemplification of the vehicle bumper 1 according to the preferred embodiment of the present invention. The storage space 11 is formed at the mid-frame portion 101 of the bumper frame 10 and is constructed to have the drawer compartment 112 with the drawer opening 1121 of the storage unit 111, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. In other words, the installation location 13 is defined at the mid-frame portion 101 of the bumper frame 10, wherein the drawer storage container 22 is formed to slidably receive in the storage space 11.

Figure 5C:
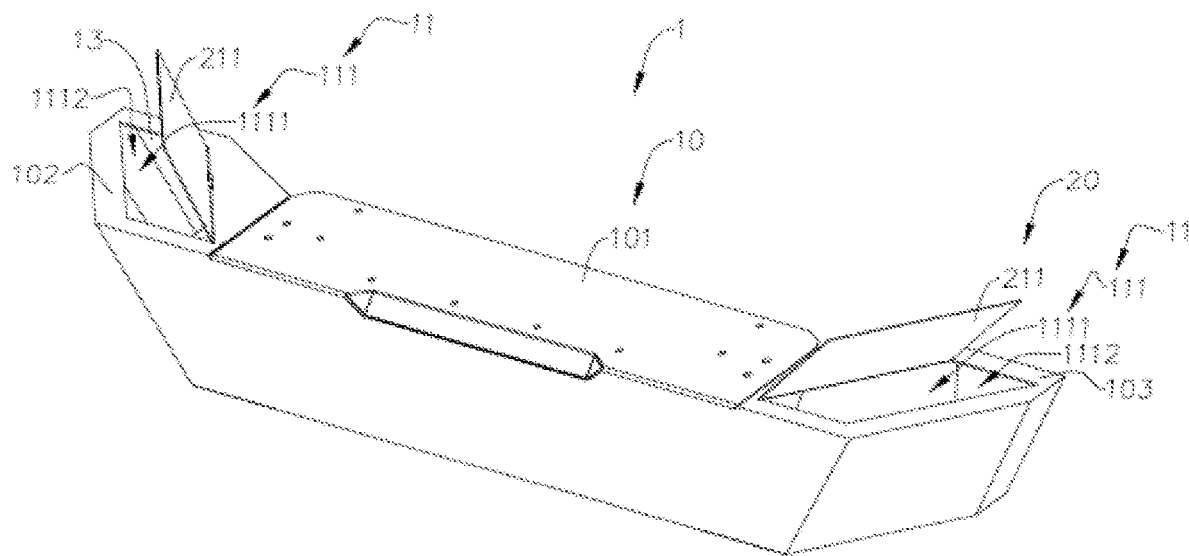
FIG. 5C illustrates a third exemplification of the vehicle bumper according to the preferred embodiment of the present invention.

FIG. 5C illustrates a third exemplification of the vehicle bumper 1 according to the preferred embodiment of the present invention. The storage space 11 is formed on at least one of the right frame portion 103 and the left frame portion 102 of the bumper frame 10. Preferably, two storage spaces 11 are formed at the right frame portion 103 and the left frame portion 102 of the bumper frame 10 respectively. Each of the storage spaces 11 is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface of each of the right frame portion 103 and the left frame portion 102 of the bumper frame 10 to form the storage compartment 1111. In other words, the installation locations 13 are defined at the right frame portion 103 and the left frame portion 102 of the bumper frame 10 respectively, wherein the cover panels 211 are pivotally coupled at the storage units 111 to form two flip type storage containers 21 respectively.

Figure 5D:
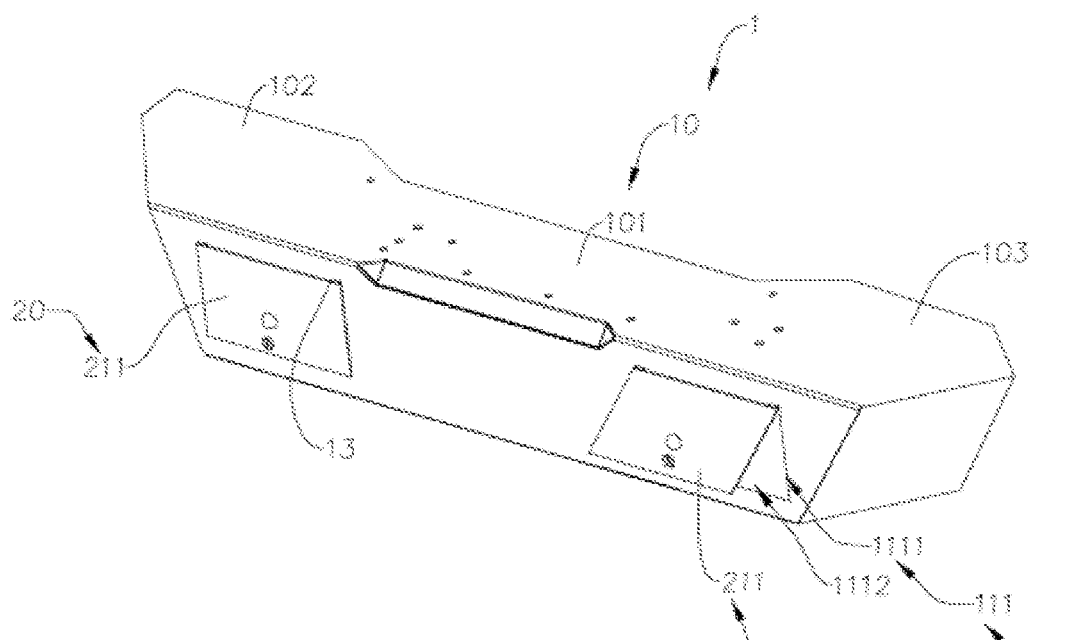
FIG. 5D illustrates a fourth exemplification of the vehicle bumper according to the preferred embodiment of the present invention.

FIG. 5D illustrates a fourth exemplification of the vehicle bumper 1 according to the preferred embodiment of the present invention. The storage space 11 is formed on at least one of the right frame portion 103 and the left frame portion 102 of the bumper frame 10. Preferably, two storage spaces 11 are formed at the right frame portion 103 and the left frame portion 102 of the bumper frame 10 respectively. Each of the storage spaces 11 is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the front opening, wherein the storage unit 111 is inwardly indented from the front surface of each of the right frame portion 103 and the left frame portion 102 of the bumper frame 10 to form the storage compartment 1111. In other words, the installation locations 13 are defined at the right frame portion 103 and the left frame portion 102 of the bumper frame 10 respectively, wherein the cover panels 211 are pivotally coupled at the storage units 111 to form two flip type storage containers 21 respectively.

Figure 5E:
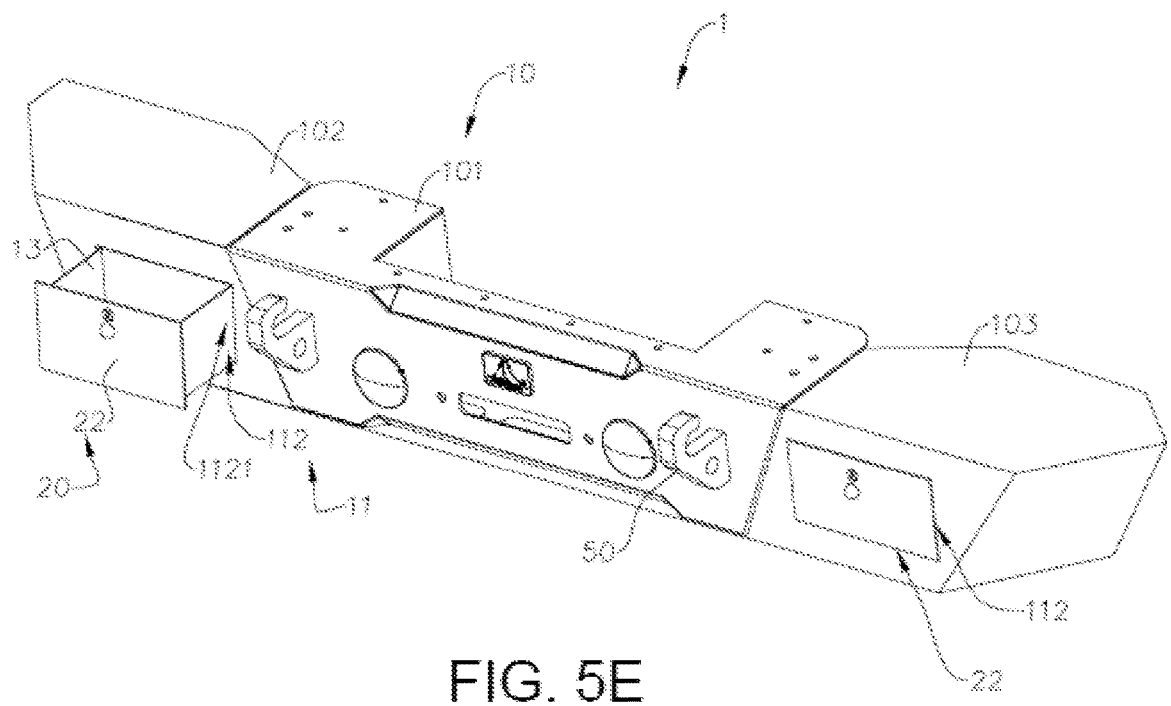
FIG. 5E illustrates a fifth exemplification of the vehicle bumper according to the preferred embodiment of the present invention.

FIG. 5E illustrates a fifth exemplification of the vehicle bumper 1 according to the preferred embodiment of the present invention. The storage space 11 is formed on at least one of the right frame portion 103 and the left frame portion 102 of the bumper frame 10. Preferably, two storage spaces 11 are formed at the right frame portion 103 and the left frame portion 102 of the bumper frame 10 respectively. Each of the storage spaces 11 is constructed to have the drawer compartment 112 with the drawer opening 1121 of the storage unit 111, wherein the drawer openings 1121 are formed at the front surfaces of the right frame portion 103 and the left frame portion 102 the bumper frame 10 respectively, such that the drawer compartments 112 are rearwardly indented from the front surfaces of the right frame portion 103 and the left frame portion 102 the bumper frame 10 respectively. The drawer storage container 22 is slidably received in each of the drawer compartments 112 through the drawer opening 1121, such that the drawer storage containers 22 are able to frontwardly slide in-and-out at the drawer compartments 112 through the drawer openings 1121 respectively. In other words, the installation locations 13 are defined at the right frame portion 103 and the left frame portion 102 of the bumper frame 10 respectively, wherein the drawer storage containers 22 are formed to slidably receive in the storage spaces 11 respectively.

Figure 5F:
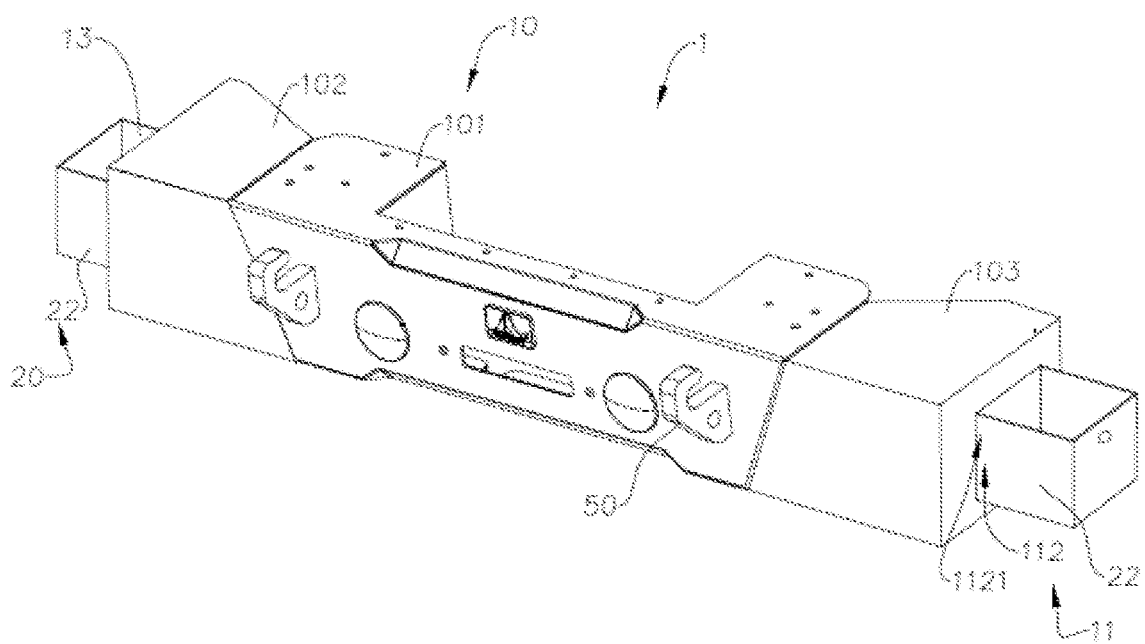
FIG. 5F illustrates a sixth exemplification of the vehicle bumper according to the preferred embodiment of the present invention.

FIG. 5F illustrates a sixth exemplification of the vehicle bumper 1 according to the preferred embodiment of the present invention. The storage space 11 is formed on at least one of the right frame portion 103 and the left frame portion 102 of the bumper frame 10. Preferably, two storage spaces 11 are formed at the right frame portion 103 and the left frame portion 102 of the bumper frame 10 respectively. Each of the storage spaces 11 is constructed to have the drawer compartment 112 with the drawer opening 1121 of the storage unit 111, wherein the drawer openings 1121 are formed at two side surfaces of the right frame portion 103 and the left frame portion 102 the bumper frame 10 respectively, such that the drawer compartments 112 are inwardly indented from the side surfaces of the right frame portion 103 and the left frame portion 102 the bumper frame 10 respectively. The drawer storage container 22 is slidably received in each of the drawer compartments 112 through the drawer opening 1121, such that the drawer storage containers 22 are able to sidewardly slide in-and-out at the drawer compartments 112 through the drawer openings 1121 respectively. In other words, the installation locations 13 are defined at the right frame portion 103 and the left frame portion 102 of the bumper frame 10 respectively, wherein the drawer storage containers 22 are formed to slidably receive in the storage spaces 11 respectively.

Figure 5G:
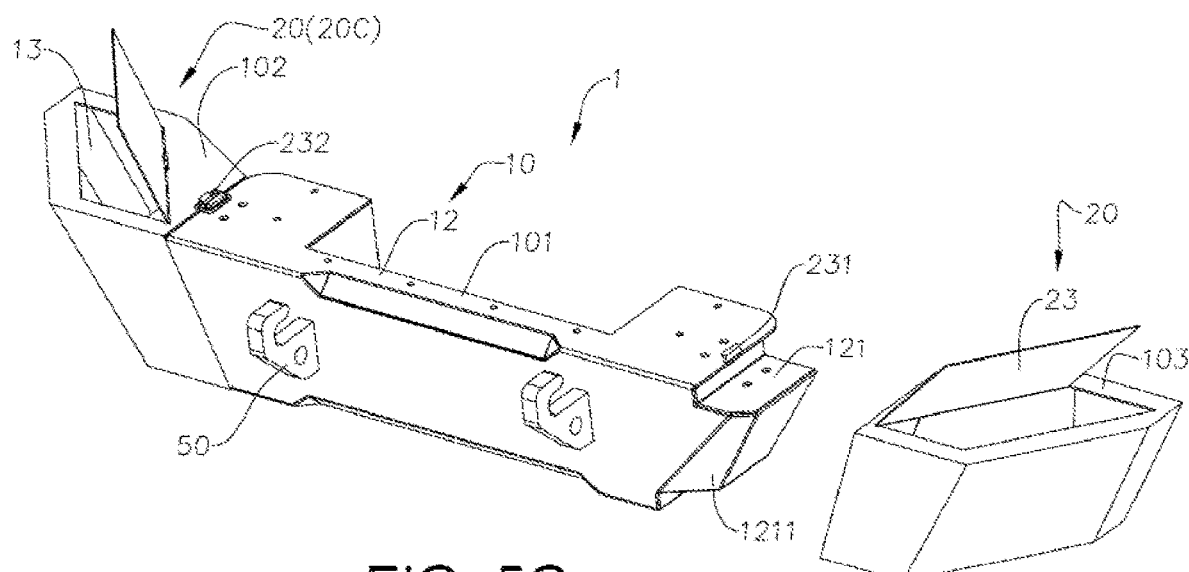
FIG. 5G illustrates a seventh exemplification of the vehicle bumper according to the preferred embodiment of the present invention.

FIG. 5G illustrates a seventh exemplification of the vehicle bumper 1 according to the preferred embodiment of the present invention. The bumper body 12 is configured to couple at the vehicle and serves as a mid-frame portion 101 of the bumper frame 10, wherein the bumper body 12 has at least one installation portion 121 at one of the side ends of the bumper body 12. Preferably, two installation portions 121 are defined at two side ends of the bumper body 12. The function unit 20 is configured to have at least one detachable storage container 23 detachably coupled at the installation portion 121 of the bumper body 12. When the detachable storage container 23 is detachably coupled at the right end side of the bumper body 12, the detachable storage container 23 forms the right frame portion 103 of the bumper frame 10. When the detachable storage container 23 is detachably coupled at the left end side of the bumper body 12, the detachable storage container 23 forms the left frame portion 102 of the bumper frame 10. Preferably, two detachable storage containers 23 are detachably coupled at two side ends of the bumper body 12 at the installation portions 121 thereof respectively, such that the detachable storage containers 23 form the right frame portion 103 and the left frame portion 102 of the bumper frame 10 respectively. In other words, the bumper frame 10 is constructed to have the bumper body 12 and two detachable storage containers 23 coupled at the right frame portion 103 and the left frame portion 102 of the bumper frame 10 respectively.

Accordingly, the bumper body 12 further comprises a positioning device 1211 formed at the installation portion 121 to detachably couple with the detachable storage container 23. The positioning device 1211 can be a protrusion protruded from the installation portion 121 or an indention indented from the installation portion 121. Correspondingly, the installation locations 13 are defined at two side ends of the bumper body 12 respectively to detachably couple two detachable storage containers 23 thereat.

The detachable storage container 23 further comprises a first quick releasable locker 231 provided at the bumper body 12 and a second quick releasable locker 232 provided at the detachable storage container 23, wherein when the second quick releasable locker 232 is releasably locked with the first quick releasable locker 203, the detachable storage container 23 is locked at installation portion 121 of the bumper body 12. Via the first quick releasable locker 231 and the second quick releasable locker 232, the detachable storage container 23 can be quickly and conveniently locked at installation portion 121 of the bumper body 12 and can be quickly and conveniently detached from the installation portion 121 of the bumper body 12. Furthermore, the tow assembly 50, which is embodied to have two towing hooks, is provided at the front surface of the bumper body 12.

Figure 5H:
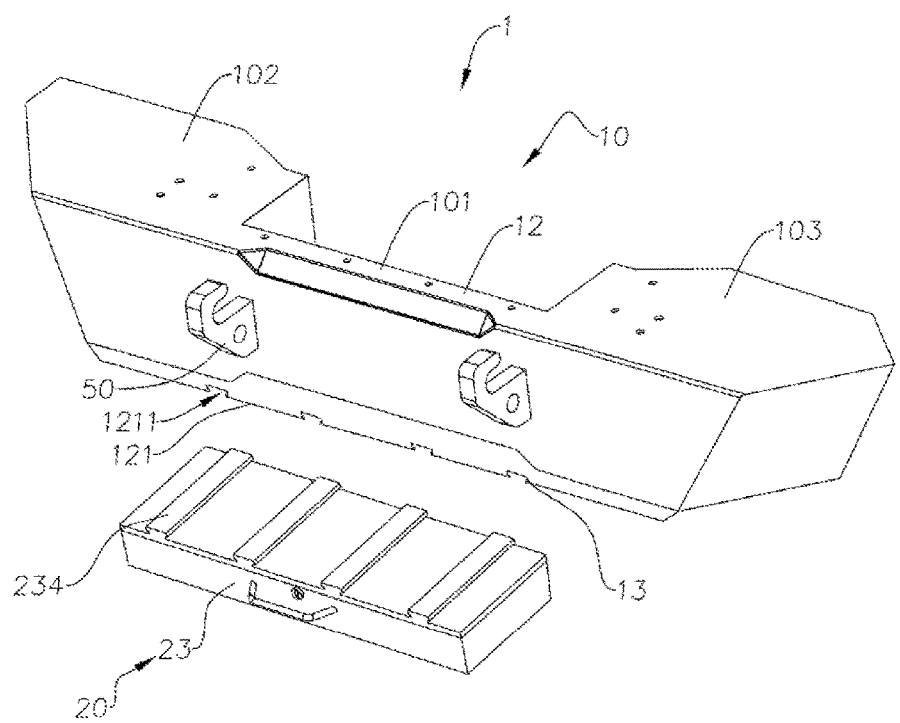
FIG. 5H illustrates an eighth exemplification of the vehicle bumper according to the preferred embodiment of the present invention.

FIG. 5H illustrates an eighth exemplification of the vehicle bumper 1 according to the preferred embodiment of the present invention. The bumper body 12 is configured to couple at the vehicle and serves as a mid-frame portion 101 of the bumper frame 10, wherein the installation portion 121 is defined at a bottom surface of the bumper frame 10. Particularly, the installation portion 121 is defined at the bottom surface of the bumper body 12 of the bumper frame 10. The function unit 20 is configured to have one detachable storage container 23 detachably coupled at the installation portion 121 of the bumper body 12, such that the detachable storage container 23 is detachably coupled at the bottom surface of the bumper frame 10. In other words, the installation location 13 is defined at the bottom surface of the bumper body 12 of the bumper frame 10.

Accordingly, the bumper body 12 further comprises one or more positioning devices 1211 formed at the installation portion 121 to detachably couple with the detachable storage container 23. Correspondingly, the detachable storage container 23 further comprises one or more coupling devices 233 coupling with the positioning device 1211. For example, when the positioning device 1211 is a protrusion protruded from the installation portion 121, the coupling device 233 is an indention indented on the detachable storage container 23 to match with and couple to the positioning device 1211. Likewise, when the positioning device 1211 is an indention indented on the installation portion 121, the coupling device 233 is a protrusion protruded from the detachable storage container 23 to match with and couple to the positioning device 1211. In other words, via the protrusion and indention engagement of the positioning device 1211 and the coupling device 233, the detachable storage container 23 can be aligned with and retained at the installation portion 121 of the bumper frame 10. Preferably, a plurality of positioning devices 1211 are embodied as a plurality of guiding slots spacedly indented on the bottom surface of the bumper frame 10, wherein a plurality of coupling devices 233 are embodied as a plurality of guiding protrusions spacedly protruded from a top surface of the detachable storage container 23 to slidably engage with the guiding slots respectively so as to guide and retain the detachable storage container 23 at the installation portion 121 of the bumper frame 10. Particularly, the guiding protrusions are slidably engaged with the guiding slots to couple the detachable storage container 23 at the bottom surface of the bumper frame 10. The detachable storage container 23 is slid to disengage the guiding protrusions with the guiding slots to detach the detachable storage container 23 from the bottom surface of the bumper frame 10.

Figure 5I:
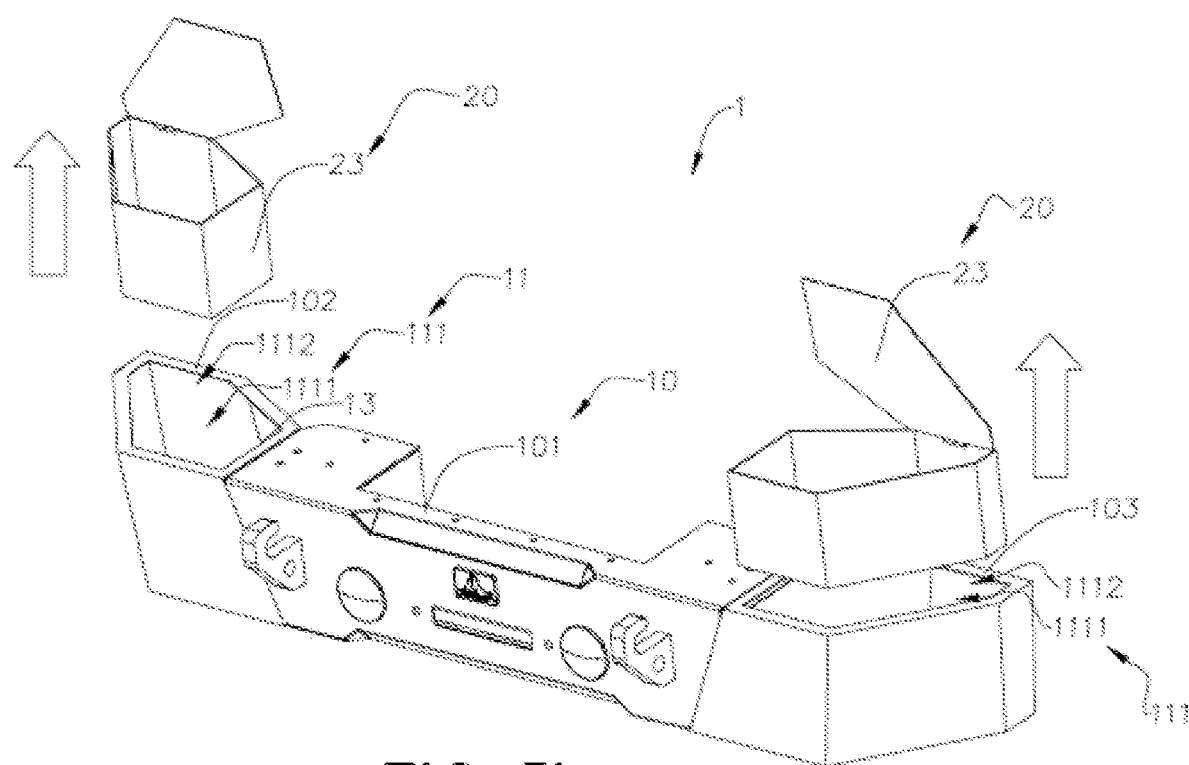
FIG. 5I illustrates a ninth exemplification of the vehicle bumper according to the preferred embodiment of the present invention.

FIG. 5I illustrates a ninth exemplification of the vehicle bumper 1 according to the preferred embodiment of the present invention. The storage space 11 is formed on at least one of the right frame portion 103 and the left frame portion 102 of the bumper frame 10. Preferably, two storage spaces 11 are formed at the right frame portion 103 and the left frame portion 102 of the bumper frame 10 respectively. Each of the storage spaces 11 is constructed to have the storage compartment 1111 and the compartment opening 1112 of the storage unit 111, wherein the compartment opening 1112 is the top opening, wherein the storage unit 111 is downwardly indented from the top surface of each of the right frame portion 103 and the left frame portion 102 of the bumper frame 10 to form the storage compartment 1111. The function unit 20 is configured to have at least one detachable storage container 23 detachably received at the storage compartment 1111 of the storage unit 111 through the compartment opening 1112. Preferably two detachable storage containers 23 are detachably received at the storage compartments 1111 of the storage units 111 through the compartment openings 1112, such that the detachable storage containers 23 are detachably received at the right frame portion 103 and the left frame portion 102 of the bumper frame 10 respectively. In other words, the installation locations 13 are defined at the right frame portion 103 and the left frame portion 102 of the bumper frame 10 respectively, wherein the detachable storage containers 23 are detachably received in the storage spaces 11 at the right frame portion 103 and the left frame portion 102 of the bumper frame 10 respectively.

According to the preferred embodiment, there are different combinations of the bumper frame 10 and the function unit 20 to form the vehicle bumper 1 of the present invention.

Figure 6A:
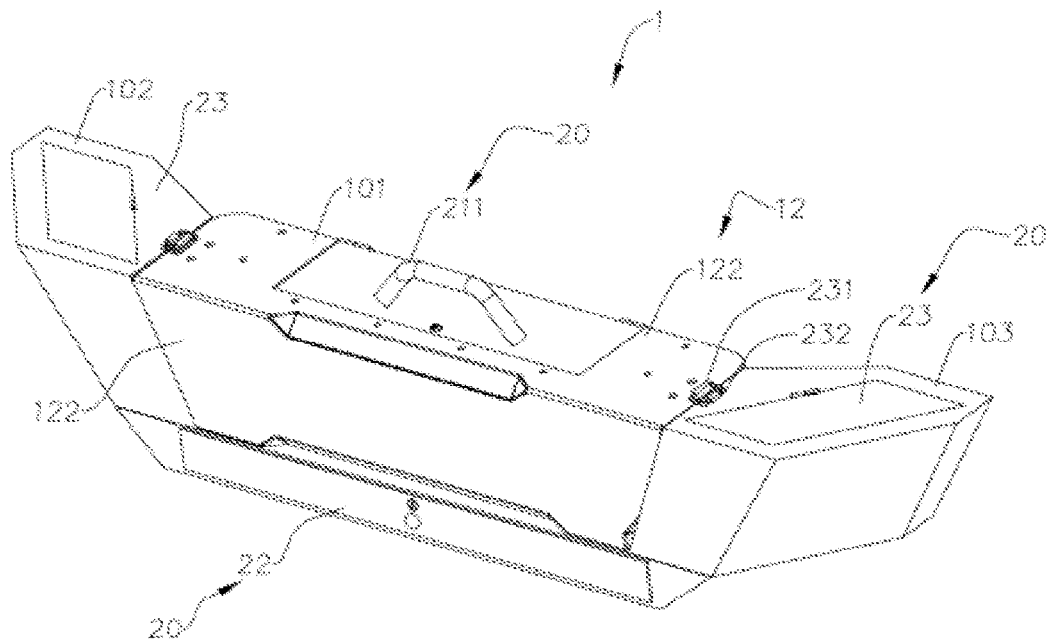
FIGS. 6A and 6B are perspective views of the vehicle bumper according to the preferred embodiment of the present invention, illustrating a first combination of the bumper frame and the function unit.
Figure 6B:
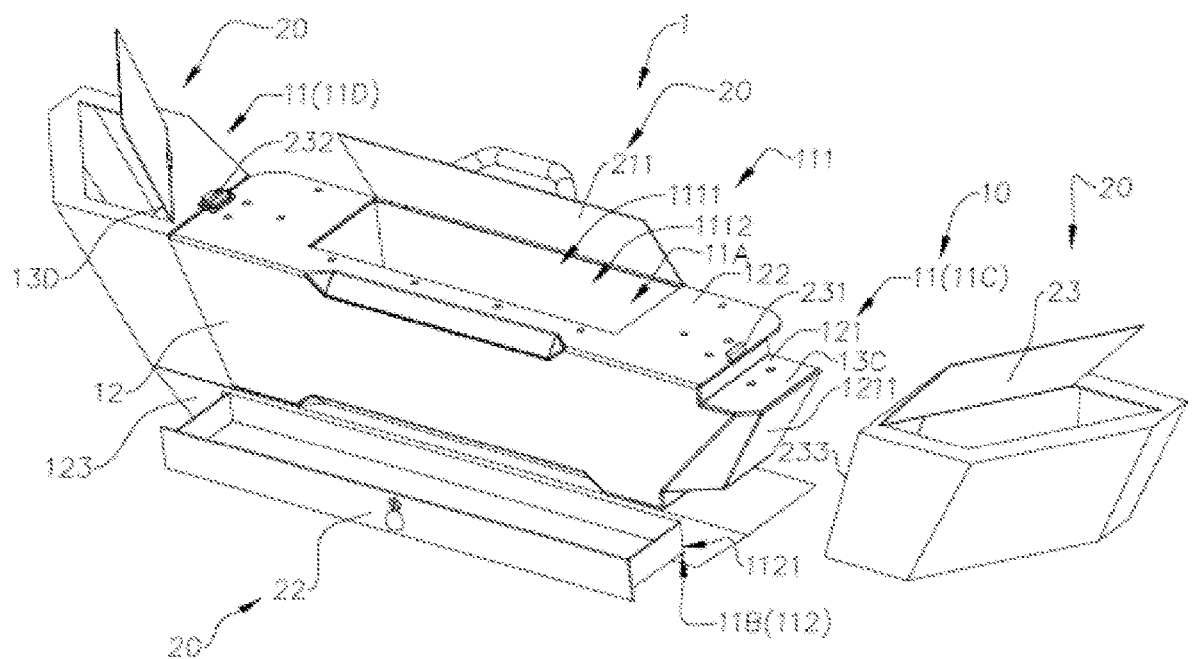

FIGS. 6A and 6B illustrate a first combination of the bumper frame 10 and the function unit 20. As it is mentioned above, the bumper frame is constructed to have one or more storage spaces 11 and the bumper body 12, wherein the storages spaces 11 can be arranged at different positions of the bumper body 12 to incorporate with one or more of the function units 20. The storage space 11 can be formed at the top surface, bottom surface, front surface or side surface of the bumper body 12.

Accordingly, the function unit 20 is constructed to have one flip type storage container 21, one drawer storage container 22 and two detachable storage containers 23. Particularly, the vehicle bumper 1 is formed to combine the first exemplification, the second exemplification and the seventh exemplification together.

For the flip type storage container 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the drawer storage container 22, the second storage space 11B is formed at the mid-frame portion 101 of the bumper frame 10 and is constructed to have the drawer compartment 112 with the drawer opening 1121 of the storage unit 111, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. Particularly, the second storage space 11B is formed at the front surface 123 of the mid-frame portion 101 of the bumper frame 10, wherein the storage unit 111 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. It is worth mentioning that the first storage space 11A and the second storage space 11B are formed at the top surface 122 and the front surface of the bumper body 12, such that the flip type storage container 21 and the drawer storage container 22 can be operated individually with interfering with each other.

For the two detachable storage containers 23, the bumper body 12 is configured to couple at the vehicle and serves as a mid-frame portion 101 of the bumper frame 10, wherein the bumper body 12 has at least one installation portion 121 at one of the side ends of the bumper body 12. Preferably, two installation portions 121 are defined at two side ends of the bumper body 12. The function unit 20 is configured to have at least one detachable storage container 23 detachably coupled at the installation portion 121 of the bumper body 12. When the detachable storage container 23 is detachably coupled at the right end side of the bumper body 12, the detachable storage container 23 forms the right frame portion 103 of the bumper frame 10. When the detachable storage container 23 is detachably coupled at the left end side of the bumper body 12, the detachable storage container 23 forms the left frame portion 102 of the bumper frame 10. Preferably, two detachable storage containers 23 are detachably coupled at two side ends of the bumper body 12 at the installation portions 121 thereof respectively, such that the detachable storage containers 23 form the right frame portion 103 and the left frame portion 102 of the bumper frame 10 respectively.

Furthermore, two installation portions 121 are defined at two side ends of the bumper body 12 to form a third storage space 11C and a fourth storage space 11D to detachably receive two detachable storage containers 23 respectively.

When the detachable storage containers 23 is detachably coupled at the right end side and left end side of the bumper body 12, the detachable storage containers 23 form the right frame portion 103 and the left frame portion 102 of the bumper frame 10 respectively. Two positioning devices 1211 are formed at the right side end and the left side end of the bumper body 12 respectively to define a third installation position 13C and a fourth installation position 13D at the bumper frame 10 to detachably couple with the detachable storage containers 23 respectively.

Accordingly, two detachable storage containers 23 are detachably coupled at the installation portions 121 which are defined at the right side end and the left side end of the bumper body 12 as the third storage space 11C and the fourth storage space 11D respectively. Each of the detachable storage containers 23 is constructed to have the first quick releasable locker 231 provided at the bumper body 12 and a second quick releasable locker 232 provided at the detachable storage container 23. When the second quick releasable locker 232 is releasably locked with the first quick releasable locker 203, the detachable storage container 23 is locked at installation portion 121 of the bumper body 12 of the bumper frame 10. Two positioning devices 1211 are provided at the right side end and the left side end of the bumper body 12 respectively. The positioning device 1211 can be a protrusion or indention to couple with the detachable storage container 23. For example, when the positioning device 1211 is a protrusion protruded from the installation portion 121, the coupling device 233 is an indention indented on the detachable storage container 23 to match with and couple to the positioning device 1211. Likewise, when the positioning device 1211 is an indention indented on the installation portion 121, the coupling device 233 is a protrusion protruded from the detachable storage container 23 to match with and couple to the positioning device 1211. In other words, via the protrusion and indention engagement of the positioning device 1211 and the coupling device 233, the detachable storage container 23 can be aligned with and retained at the installation portion 121 of the bumper frame 10.

Figure 7:
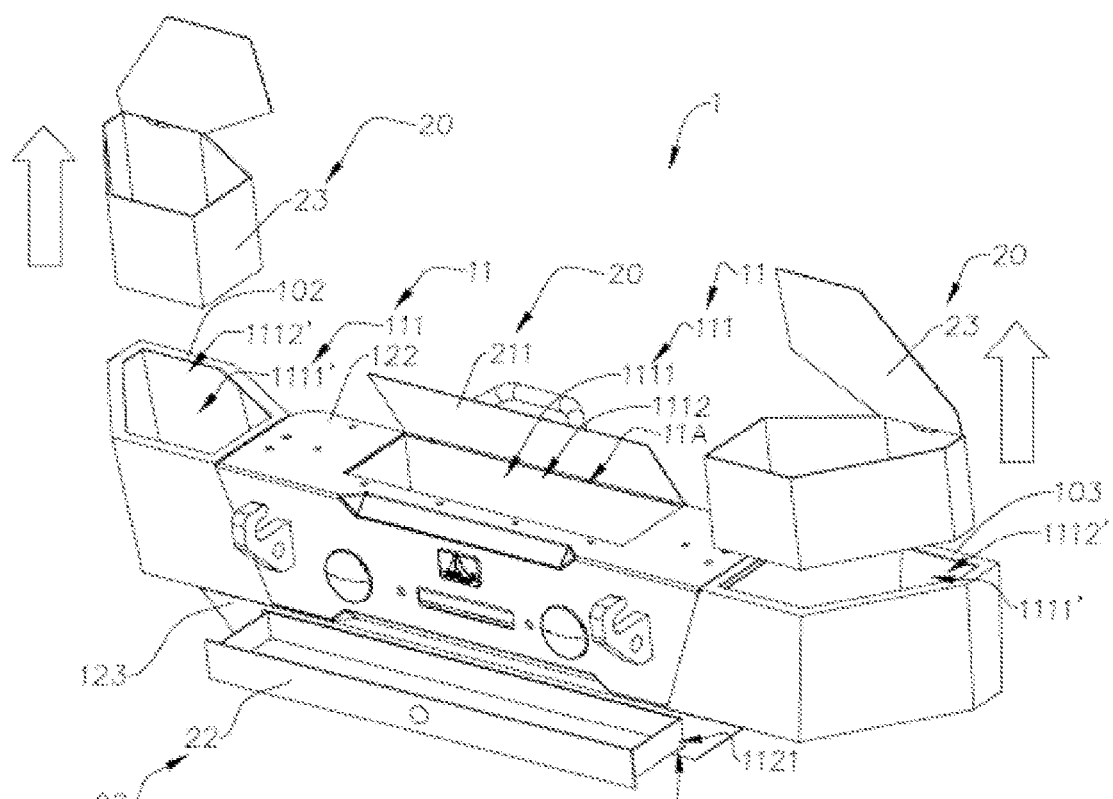
FIG. 7 is a perspective view of the vehicle bumper according to the preferred embodiment of the present invention, illustrating a second combination of the bumper frame and the function unit.

FIG. 7 illustrates a second combination of the bumper frame 10 and the function unit 20. The function unit 20 is constructed to have one flip type storage container 21, one drawer storage container 22 and two detachable storage containers 23. Particularly, the vehicle bumper 1 is formed to combine the first exemplification, the eighth exemplification and the ninth exemplification together.

For the flip type storage container 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the drawer storage container 22, the second storage space 11B is formed at the mid-frame portion 101 of the bumper frame 10 and is constructed to have the drawer compartment 112 with the drawer opening 1121 of the storage unit 111, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. The second storage space 11B is formed at the front surface 123 of the mid-frame portion 101 of the bumper frame 10, wherein the storage unit 111 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For the two detachable storage containers 23, two storage spaces 11 are further formed at the right frame portion 103 and the left frame portion 102 of the bumper frame 10 respectively. Each of the storage spaces 11 is constructed to have the storage compartment 1111' and the compartment opening 1112' of the storage unit 111, wherein the compartment opening 1112' is the top opening, wherein the storage unit 111 is downwardly indented from the top surface of each of the right frame portion 103 and the left frame portion 102 of the bumper frame 10 to form the storage compartment 1111'. The function unit 20 is configured to have at least one detachable storage container 23 detachably received at the storage compartment 1111 of the storage unit 111 through the compartment opening 1112. Preferably two detachable storage containers 23 are detachably received at the storage compartments 1111' of the storage units 111 through the compartment openings 1112', such that the detachable storage containers 23 are detachably received at the right frame portion 103 and the left frame portion 102 of the bumper frame 10 respectively.

In other words, the left frame portion 102 and the right frame portion 103 are sidewardly extended from the top surface 122 of the bumper frame 10 to define the two storage compartments 1111' respectively. The two detachable storage containers 23 are guided and received in the storage compartments 1111' respectively.

Figure 8:
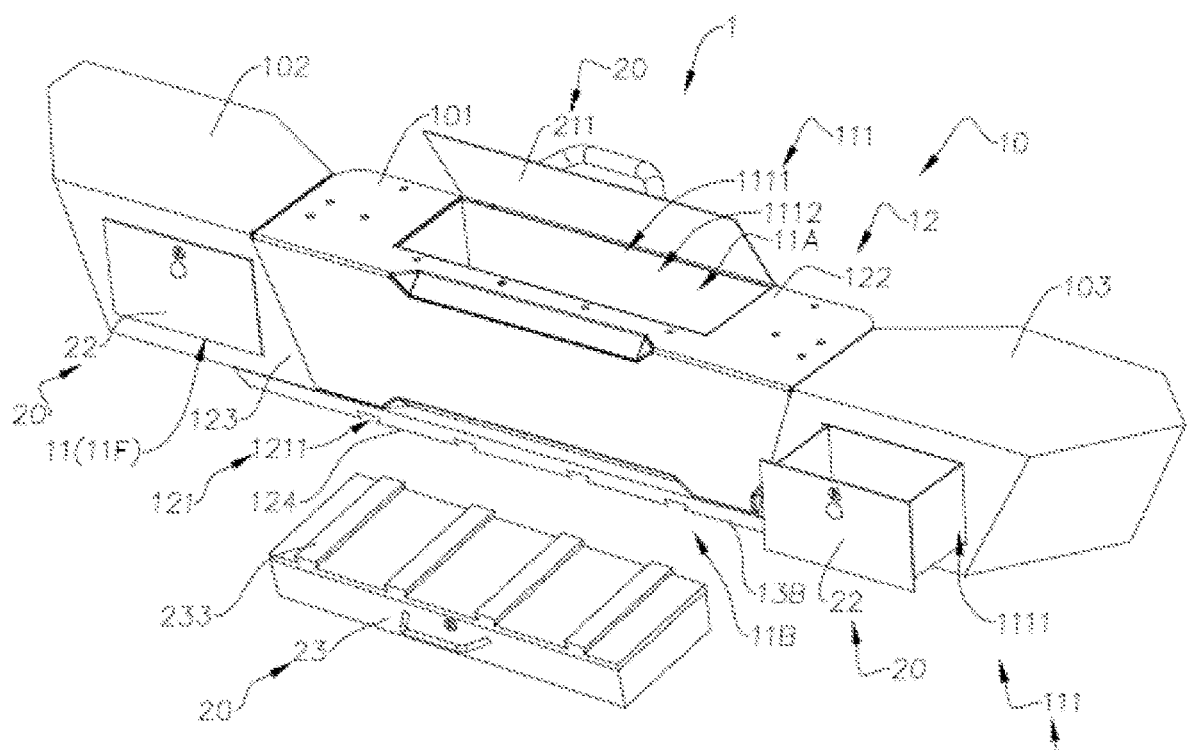
FIG. 8 is a perspective view of the vehicle bumper according to the preferred embodiment of the present invention, illustrating a third combination of the bumper frame and the function unit.

FIG. 8 illustrates a third combination of the bumper frame 10 and the function unit 20. The function unit 20 is constructed to have one flip type storage container 21, two drawer storage containers 22 and one detachable storage container 23. Particularly, the vehicle bumper 1 is formed to combine the first exemplification, the fifth exemplification and the eighth exemplification together.

For the flip type storage container 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the detachable storage container 23, the second storage space 11B is formed at the bottom surface 124 of the bumper frame 10, wherein the detachable storage container 23 is detachably coupled at the bottom surface 124 of the bumper body 12 of the bumper frame 10. The positioning devices 1211 are formed at the bottom surface 124 of the bumper frame 10 to detachably couple with the coupling devices 233 of the detachable storage container 23. The positioning devices 1211 are embodied as a plurality of guiding slots spacedly indented on the bottom surface of the bumper frame 10, and the coupling devices 233 are embodied as guiding protrusions spacedly protruded from a top surface of the detachable storage container 23 to slidably engage with the guiding slots respectively so as to guide and retain the detachable storage container 23 at the installation portion 121 of the bumper frame 10. Particularly, the guiding protrusions are slidably engaged with the guiding slots to couple the detachable storage container 23 at the bottom surface of the bumper frame 10. The detachable storage container 23 is frontwardly slid to disengage the guiding protrusions with the guiding slots to detach the detachable storage container 23 from the bottom surface of the bumper frame 10.

For the two drawer storage containers 22, the third and fourth storage spaces 11E, 11F are formed at the left frame portion 102 and the right frame portion 103 of the bumper frame 10 respectively, wherein the drawer openings are formed at the front surfaces 123 of the right frame portion 103 and the left frame portion 102 the bumper frame 10 respectively, such that the drawer compartments are rearwardly indented from the front surfaces 123 of the right frame portion 103 and the left frame portion 102 the bumper frame 10 respectively. The drawer storage containers 22 are slidably received in the drawer compartments through the drawer opening, such that the drawer storage containers 22 are able to frontwardly slide in-and-out at the third and fourth storage spaces 11E, 11F respectively.

Figure 9:
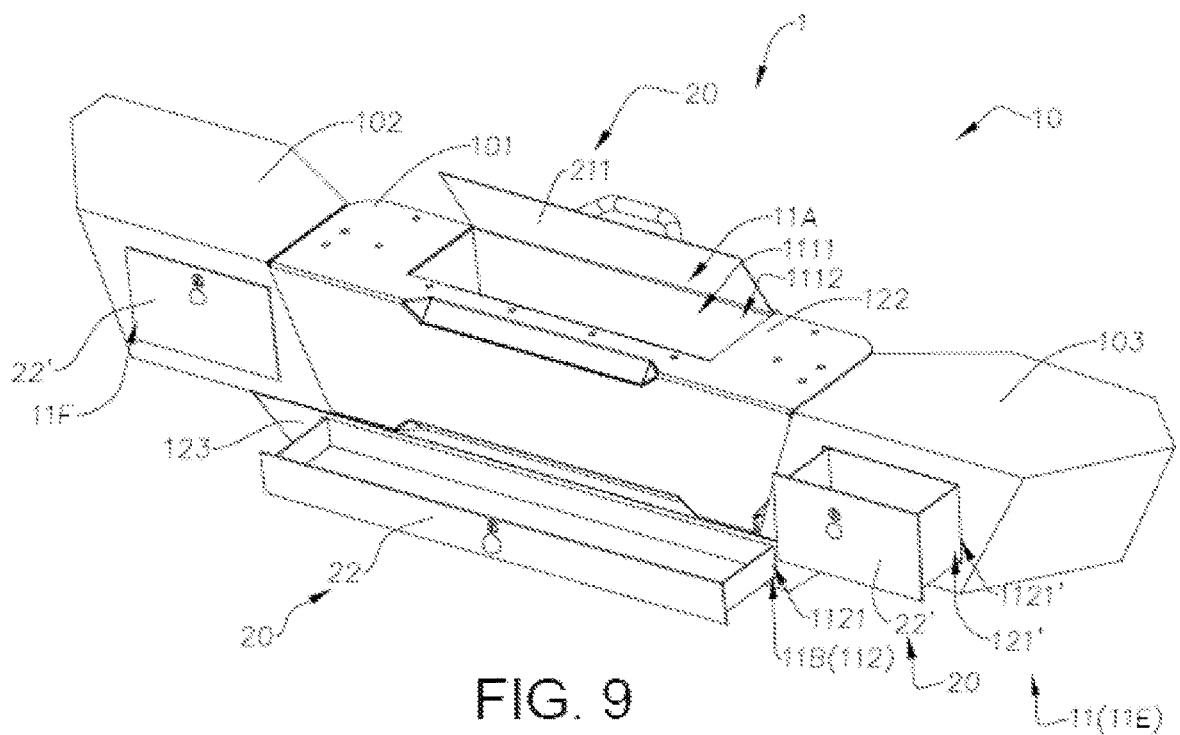
FIG. 9 is a perspective view of the vehicle bumper according to the preferred embodiment of the present invention, illustrating a fourth combination of the bumper frame and the function unit.

FIG. 9 illustrates a fourth combination of the bumper frame 10 and the function unit 20. The function unit 20 is constructed to have one flip type storage container 21 and three drawer storage containers 22. Particularly, the vehicle bumper 1 is formed to combine the first exemplification, the second exemplification and the fifth exemplification together.

For the flip type storage container 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For one of the three drawer storage containers 22, the second storage space 11B is formed at the mid-frame portion 101 of the bumper frame 10 and is constructed to have the drawer compartment 112 with the drawer opening 1121 of the storage unit 111, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. The second storage space 11B is formed at the front surface 123 of the mid-frame portion 101 of the bumper frame 10, wherein the storage unit 111 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For other two of the three drawer storage containers 22, the third and fourth storage spaces 11E, 11F are formed the installation portions 121' which are the left frame portion 102 and the right frame portion 103 of the bumper frame 10 respectively, wherein the drawer openings 1121' are formed at the front surfaces 123 of the right frame portion 103 and the left frame portion 102 the bumper frame 10 respectively, such that the drawer compartments are rearwardly indented from the front surfaces 123 of the right frame portion 103 and the left frame portion 102 the bumper frame 10 respectively. The drawer storage containers 22' are slidably received in the drawer compartments through the drawer opening, such that the drawer storage containers 22' are able to frontwardly slide in-and-out at the third and fourth storage spaces 11E, 11F respectively.

Figure 10:
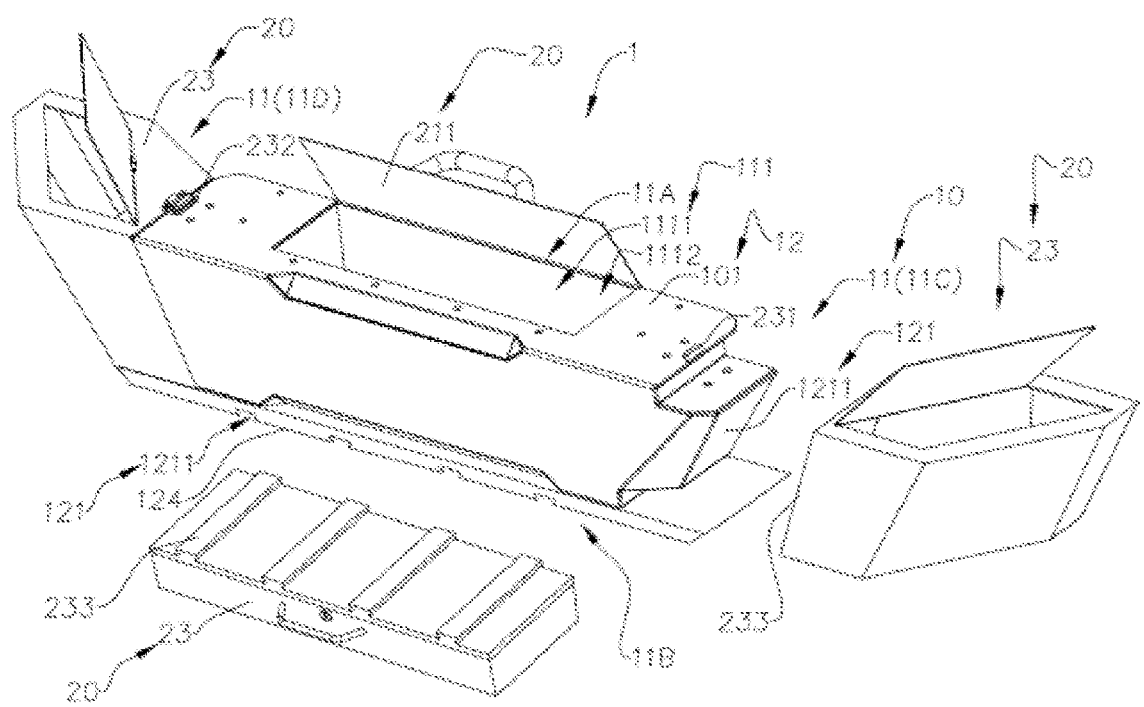
FIG. 10 is a perspective view of the vehicle bumper according to the preferred embodiment of the present invention, illustrating a fifth combination of the bumper frame and the function unit.

FIG. 10 illustrates a fifth combination of the bumper frame 10 and the function unit 20. The function unit 20 is constructed to have one flip type storage container 21 and three detachable storage containers 23. Particularly, the vehicle bumper 1 is formed to combine the first exemplification, the seventh exemplification and the eighth exemplification together.

For the flip type storage container 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For one of the three detachable storage containers 23, the second storage space 11B is formed at the bottom surface 124 of the bumper frame 10, wherein the detachable storage container 23 is detachably coupled at the bottom surface 124 of the bumper body 12 of the bumper frame 10. The positioning devices 1211 are formed at the bottom surface 124 of the bumper frame 10 to detachably couple with the coupling devices 233 of the detachable storage container 23. The positioning devices 1211 are embodied as a plurality of guiding slots spacedly indented on the bottom surface of the bumper frame 10, and the coupling devices 233 are embodied as guiding protrusions spacedly protruded from a top surface of the detachable storage container 23 to slidably engage with the guiding slots respectively so as to guide and retain the detachable storage container 23 at the installation portion 121 of the bumper frame 10. Particularly, the guiding protrusions are slidably engaged with the guiding slots to couple the detachable storage container 23 at the bottom surface of the bumper frame 10. The detachable storage container 23 is frontwardly slid to disengage the guiding protrusions with the guiding slots to detach the detachable storage container 23 from the bottom surface of the bumper frame 10.

For other two of the three detachable storage containers 23, the third and fourth storage spaces 11C, 11D are formed the installation portions 121 which are the left frame portion 102 and the right frame portion 103 of the bumper frame 10 respectively. The bumper body 12 has two installation portions 121 are defined at two side ends of the bumper body 12. Two detachable storage containers 23 are detachably coupled at two side ends of the bumper body 12 at the installation portions 121 thereof respectively, such that the detachable storage containers 23 form the right frame portion 103 and the left frame portion 102 of the bumper frame 10 respectively. Two positioning devices 1211 formed at the installation portions 121 to detachably couple with the detachable storage containers 23 respectively. The first quick releasable locker 231 is provided at the bumper body 12 and the second quick releasable locker 232 is provided at the detachable storage container 23, wherein when the second quick releasable locker 232 is releasably locked with the first quick releasable locker 231, the detachable storage container 23 is locked at installation portion 121 of the bumper body 12.

Figure 11:
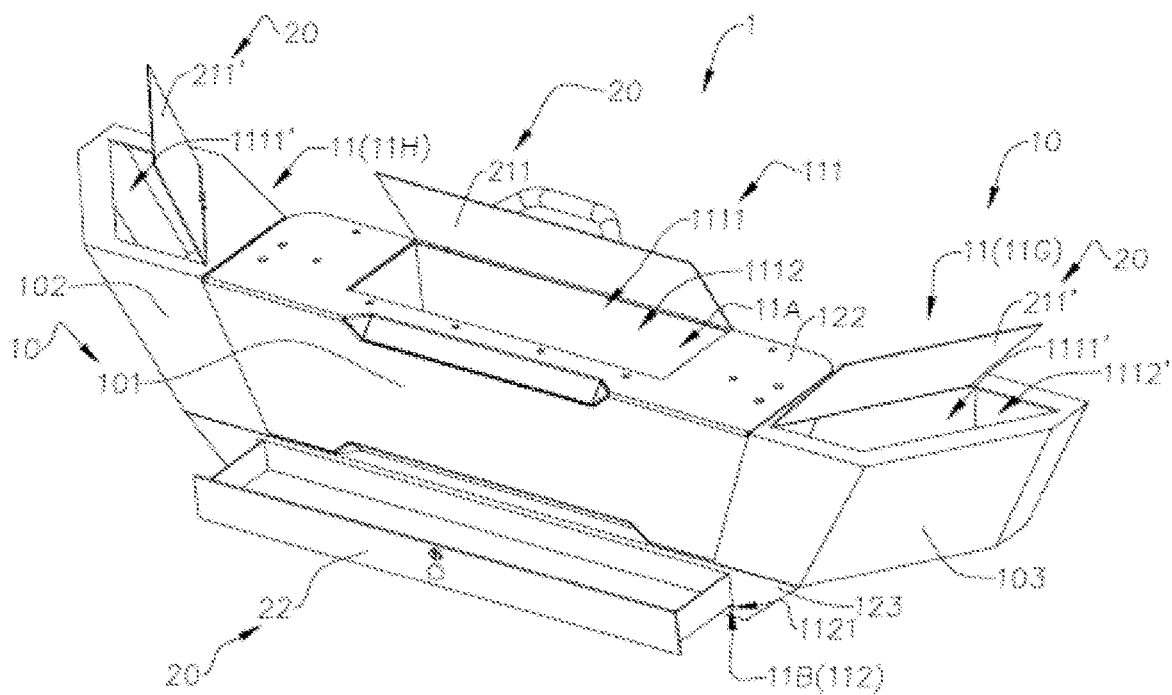
FIG. 11 is a perspective view of the vehicle bumper according to the preferred embodiment of the present invention, illustrating a sixth combination of the bumper frame and the function unit.

FIG. 11 illustrates a sixth combination of the bumper frame 10 and the function unit 20. The function unit 20 is constructed to have three flip type storage containers 21 and one drawer storage container 22. Particularly, the vehicle bumper 1 is formed to combine the first exemplification, the second exemplification and the third exemplification together.

For one of the three flip type storage containers 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the drawer storage container 22, the second storage space 11B is formed at the mid-frame portion 101 of the bumper frame 10 and is constructed to have the drawer compartment 112 with the drawer opening 1121 of the storage unit 111, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. Particularly, the second storage space 11B is formed at the front surface 123 of the mid-frame portion 101 of the bumper frame 10, wherein the storage unit 111 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. It is worth mentioning that the first storage space 11A and the second storage space 11B are formed at the top surface 122 and the front surface of the bumper body 12, such that the flip type storage container 21 and the drawer storage container 22 can be operated individually with interfering with each other.

For other two of the three flip type storage containers 21, the third and fourth storage spaces 11G, 11H are formed at the right frame portion 103 and the left frame portion 102 of the bumper frame 10 respectively. Each of the storage spaces 11G, 11H is constructed to have the storage compartment 1111' and the compartment opening 1112', wherein the cover panel 211' of the function unit 20 is pivotally coupled at the compartment opening 1112' thereof to selectively enclose the storage compartment 1111'. It is worth mentioning that the compartment opening 1112' is the top opening, wherein the storage compartment 1111' is downwardly indented from the top surface of each of the right frame portion 103 and the left frame portion 102 of the bumper frame 10 to form the storage compartment 1111'.

Figure 12:
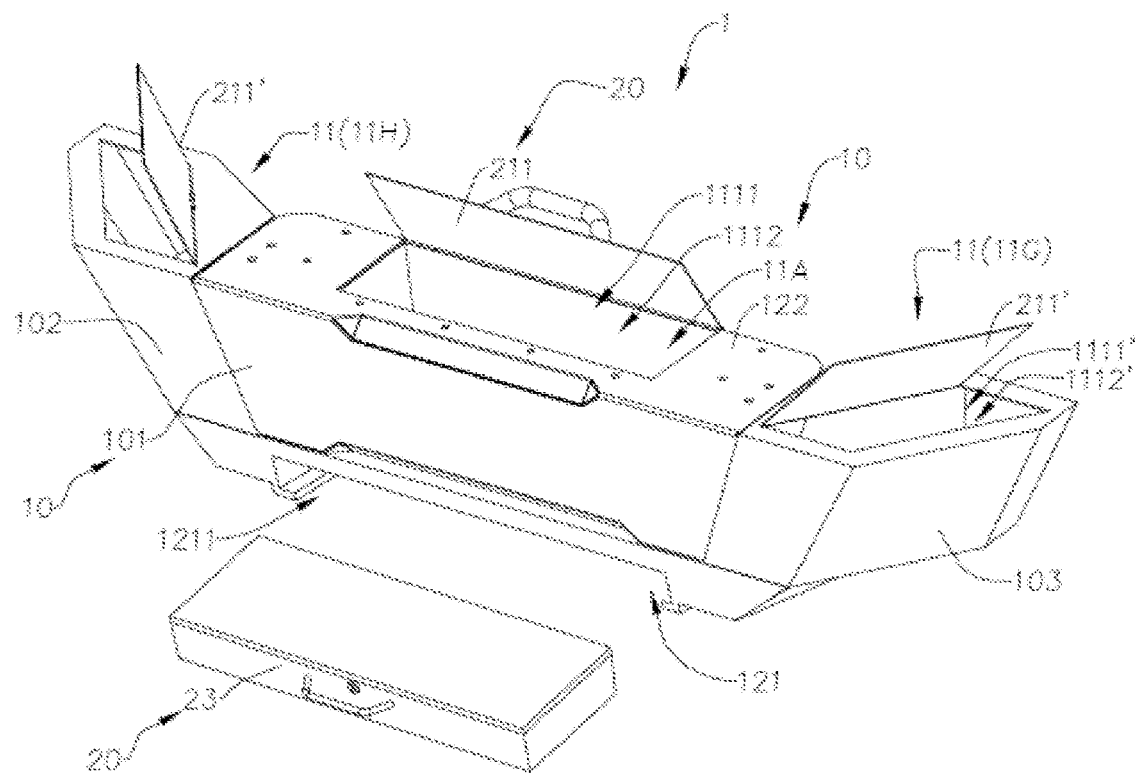
FIG. 12 is a perspective view of the vehicle bumper according to the preferred embodiment of the present invention, illustrating a seventh combination of the storage unit.

FIG. 12 illustrates a seventh combination of the bumper frame 10 and the function unit 20. The function unit 20 is constructed to have three flip type storage containers 21 and one detachable storage container 23. Particularly, the vehicle bumper 1 is formed to combine the first exemplification, the third exemplification and the eight exemplification together.

For one of the three flip type storage containers 21, the first storage space 11A is formed at the mid-frame portion 101 of the bumper frame 10 and is constructed to have the storage compartment 1111 and the compartment opening 1112 of the storage unit 111, wherein the cover panel 211 of the function unit 20 is coupled at the storage unit 111 at the compartment opening 1112 thereof to selectively enclose the storage compartment 1111. It is worth mentioning that the compartment opening 1112 is the top opening, wherein the storage unit 111 is downwardly indented from the top surface 122 of the mid-frame portion 101 of the bumper frame 10 to form the storage compartment 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the detachable storage container 23, the second storage space 11 is formed at the bottom surface of the bumper frame 10, wherein the detachable storage container 23 is detachably coupled at the bottom surface of the bumper frame 10. The positioning devices 1211 are formed at the bottom surface of the bumper frame 10 to detachably couple with the detachable storage container 23. The positioning devices 1211 are embodied as a plurality of guiding tracks spacedly indented on the bottom surface of the bumper frame 10 to slidably engage with the detachable storage container 23 so as to guide and retain the detachable storage container 23 at the installation portion 121 of the bumper frame 10.

For other two of the three flip type storage containers 21, the third and fourth storage spaces 11G, 11H are formed at the right frame portion 103 and the left frame portion 102 of the bumper frame 10 respectively. Each of the storage spaces 11G, 11H is constructed to have the storage compartment 1111' and the compartment opening 1112', wherein the cover panel 211' of the function unit 20 is pivotally coupled at the compartment opening 1112' thereof to selectively enclose the storage compartment 1111'. It is worth mentioning that the compartment opening 1112' is the top opening, wherein the storage compartment 1111' is downwardly indented from the top surface of each of the right frame portion 103 and the left frame portion 102 of the bumper frame 10 to form the storage compartment 1111'.

Figure 13A:
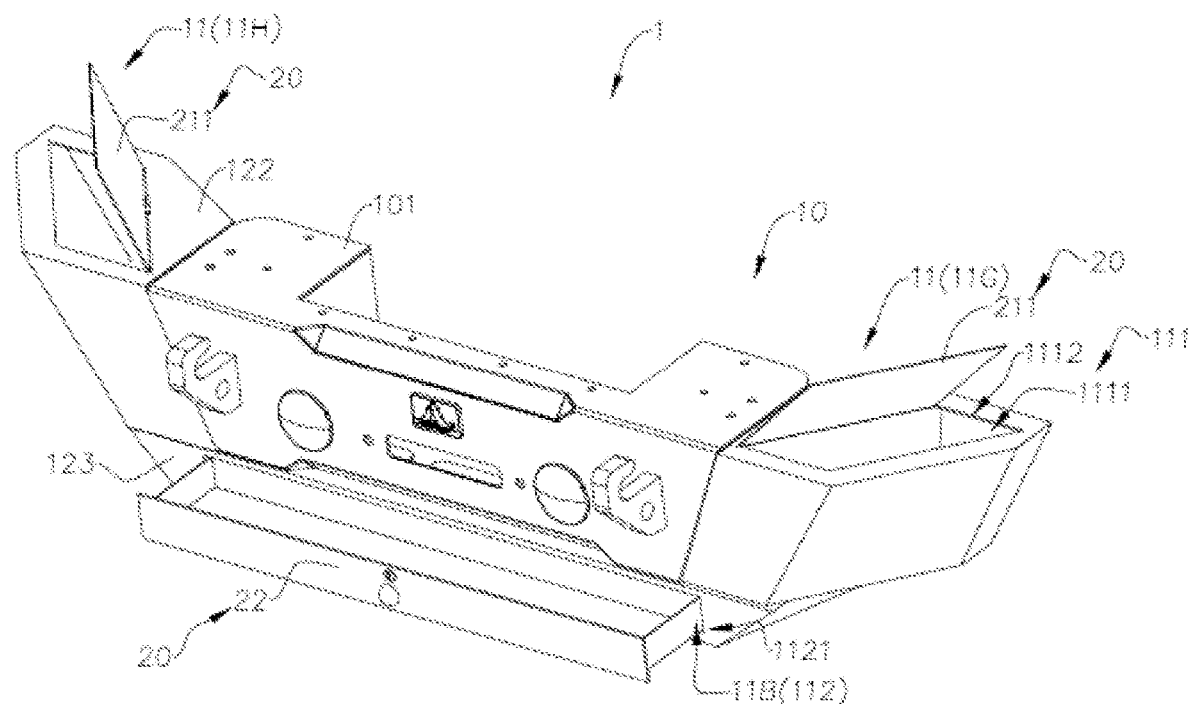
FIGS. 13A and 13B are perspective views of the vehicle bumper according to the preferred embodiment of the present invention, illustrating an eighth combination of the bumper frame and the function unit.
Figure 13B:
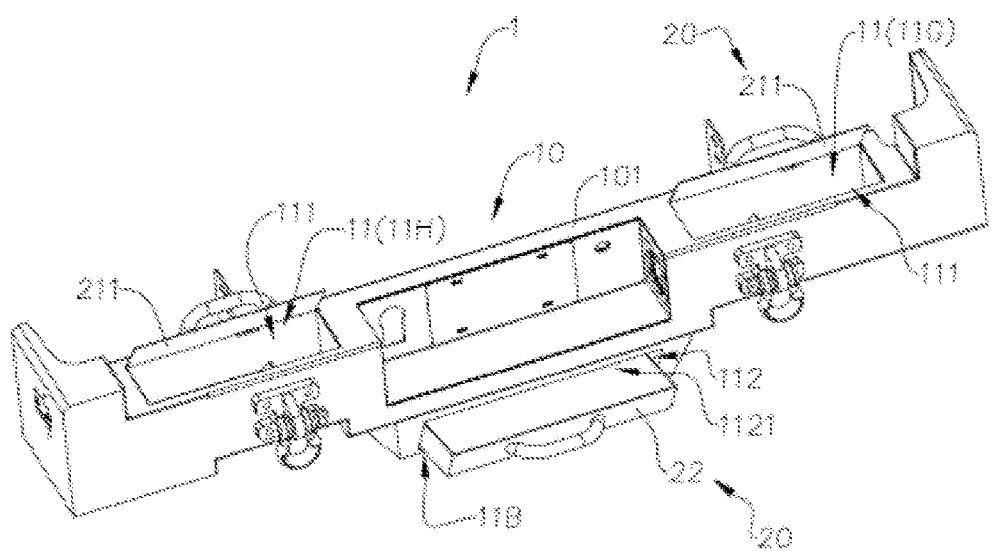

FIGS. 13A and 13B illustrate an eighth combination of the bumper frame 10 and the function unit 20. The function unit 20 is constructed to have two flip type storage containers 21 and one drawer storage container 22. Particularly, the vehicle bumper 1 is formed to combine the second exemplification and the third exemplification together.

For the drawer storage container 22, the first storage space 11B is formed at the mid-frame portion 101 of the bumper frame 10 and is constructed to have the drawer compartment 112 with the drawer opening 1121, wherein the drawer opening 1121 is formed at the front surface of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. Particularly, the first storage space 11B is formed at the front surface 123 of the mid-frame portion 101 of the bumper frame 10, wherein the storage unit 111 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For the two flip type storage containers 21, the second and third storage spaces 11G, 11H are formed at two sides of the bumper frame 10 respectively. Each of the storage spaces 11G, 11H is constructed to have the storage compartment 1111 and the compartment opening 1112, wherein the cover panel 211 of the function unit 20 is pivotally coupled at the compartment opening 1112 thereof to selectively enclose the storage compartment 1111. It is worth mentioning that the compartment opening 1112 is the top opening, wherein the storage compartment 1111 is downwardly indented from the top surface of the bumper frame 10 to form the storage compartment 1111.

It is worth mentioning that the bumper frame 10 serves as a front bumper of the vehicle, as shown in FIG. 13A, when the bumper frame 10 is detachably coupled at the front end of the vehicle, wherein the drawer storage container 22 is frontwardly slid to expose the drawer cavity thereof. Likewise, the bumper frame 10 serves as a rear bumper of the vehicle, as shown in FIG. 13B, when the bumper frame 10 is detachably coupled at the rear end of the vehicle, wherein the drawer storage container 22 is rearwardly slid to expose the drawer cavity thereof.

Figure 14A:
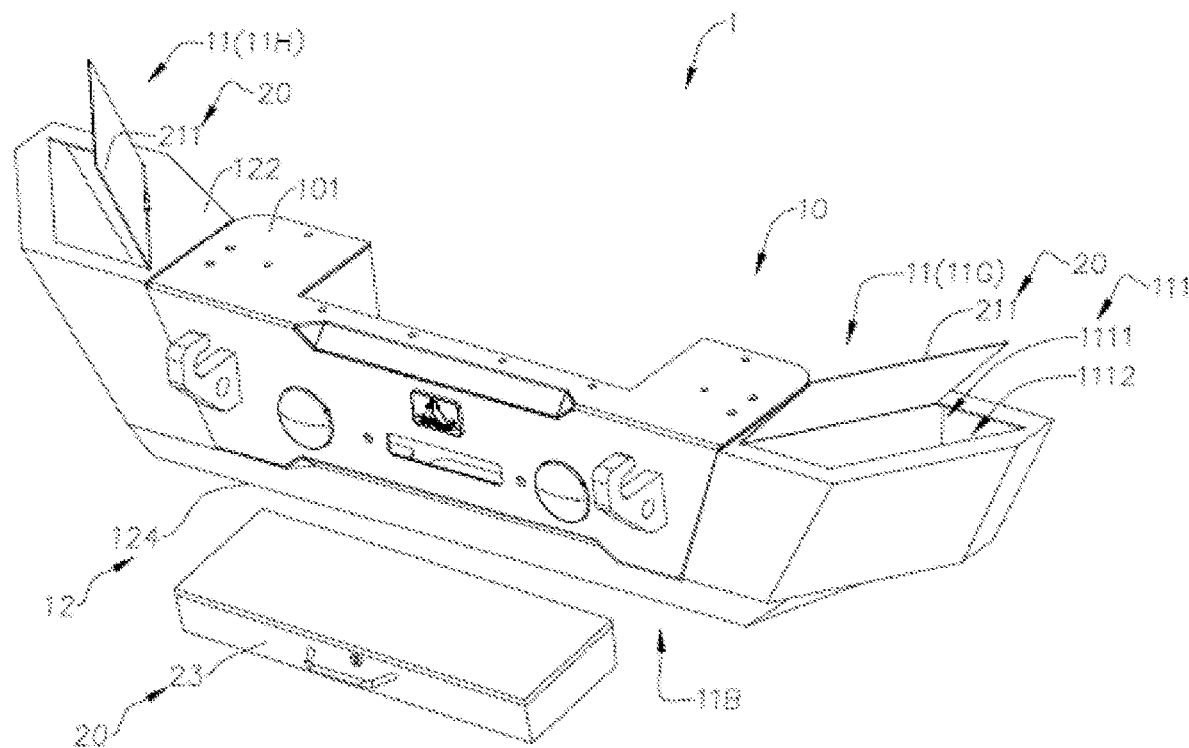
FIGS. 14A and 14B are perspective views of the vehicle bumper according to the preferred embodiment of the present invention, illustrating a ninth combination of the bumper frame and the function unit.
Figure 14B:
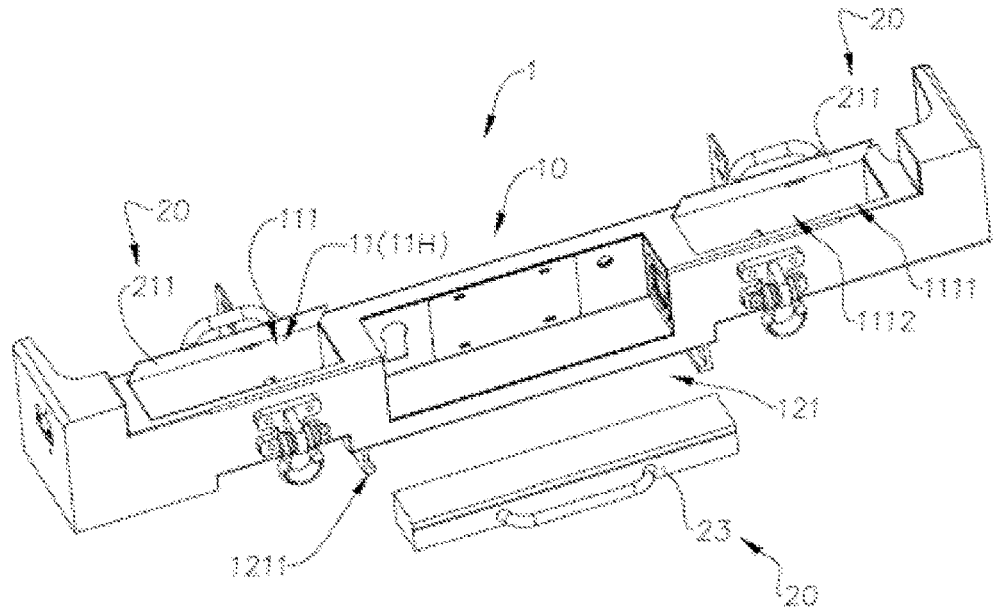

FIGS. 14A and 14B illustrate a ninth combination of the bumper frame 10 and the function unit 20. The function unit 20 is constructed to have two flip type storage containers 21 and one detachable storage container 23.

For the detachable storage container 23, the first storage space 11B is formed at the bottom surface 124 of the bumper frame 10, wherein the detachable storage container 23 is detachably coupled at the bottom surface of the bumper frame 10.

For the two flip type storage containers 21, the second and third storage spaces 11G, 11H are formed at two sides of the bumper frame 10 respectively. Each of the storage spaces 11G, 11H is constructed to have the storage compartment 1111 and the compartment opening 1112, wherein the cover panel 211 of the function unit 20 is pivotally coupled at the compartment opening 1112 thereof to selectively enclose the storage compartment 1111. It is worth mentioning that the compartment opening 1112 is the top opening, wherein the storage compartment 1111 is downwardly indented from the top surface of the bumper frame 10 to form the storage compartment 1111.

It is worth mentioning that the bumper frame 10 serves as a front bumper of the vehicle, as shown in FIG. 14A, when the bumper frame 10 is detachably coupled at the front end of the vehicle. Likewise, the bumper frame 10 serves as a rear bumper of the vehicle, as shown in FIG. 14B, when the bumper frame 10 is detachably coupled at the rear end of the vehicle.

Figure 15A:
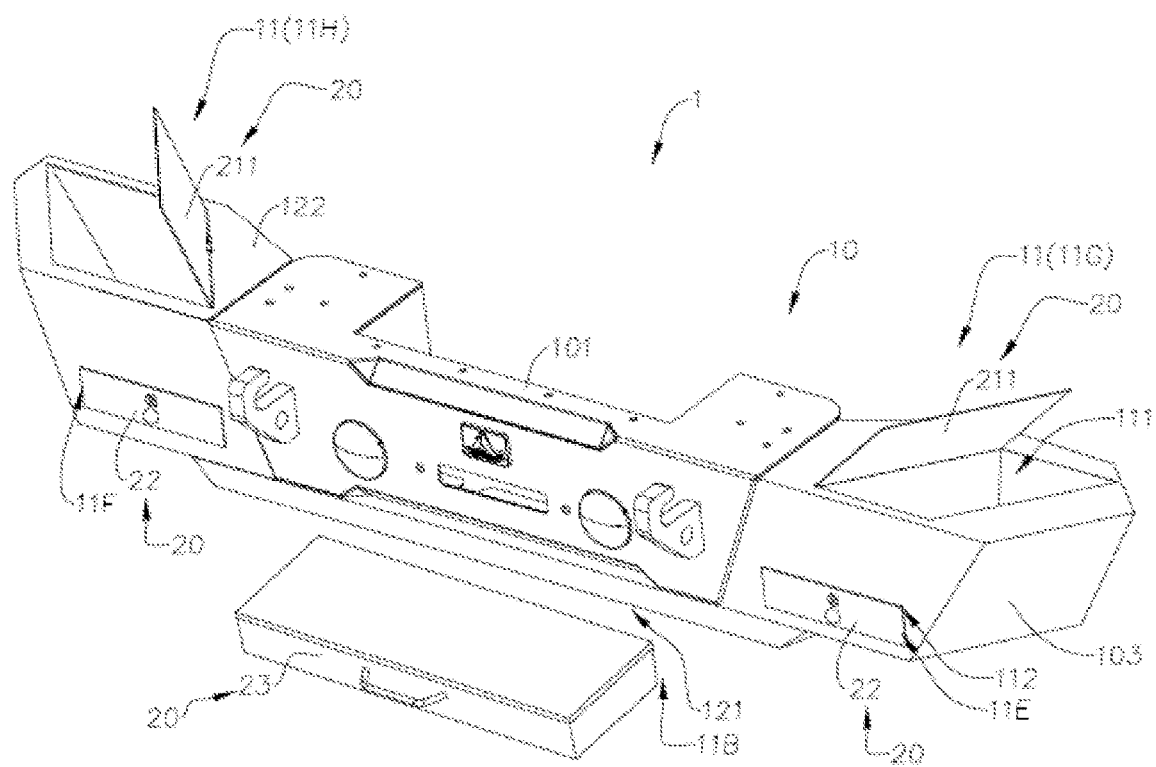
FIGS. 15A and 15B are perspective views of the vehicle bumper according to the preferred embodiment of the present invention, illustrating a tenth combination of the bumper frame and the function unit.
Figure 15B:
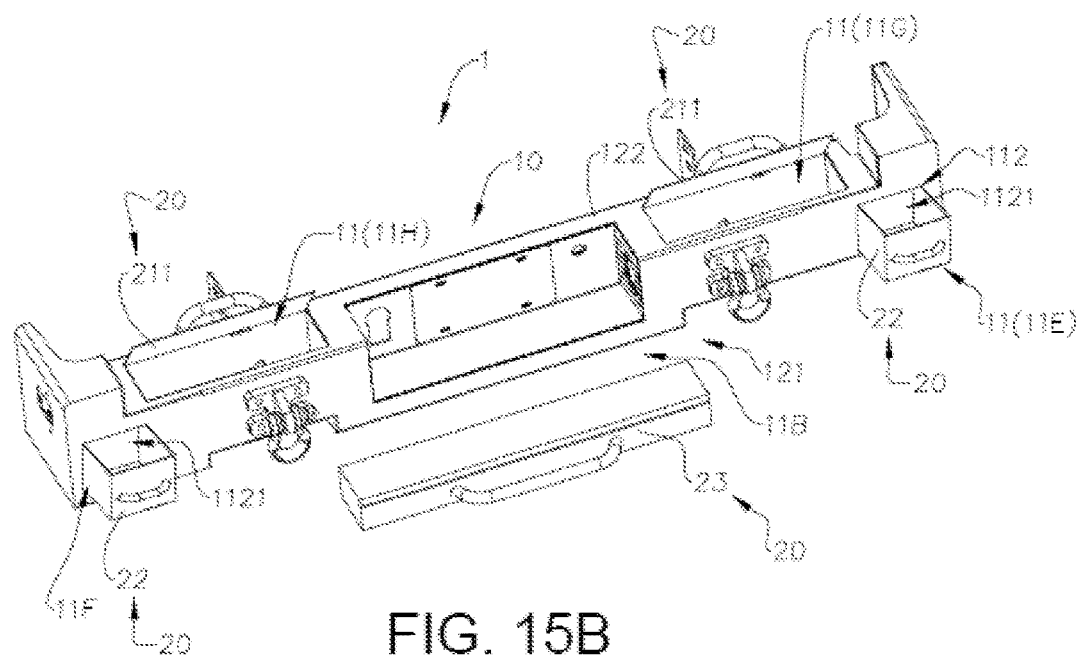

FIGS. 15A and 15B illustrate an eighth combination of the bumper frame 10 and the function unit 20. The function unit 20 is constructed to have two flip type storage containers 21, two drawer storage containers 22 and one detachable storage container 23.

For the detachable storage container 23, the first storage space 11B is formed at the bottom surface 124 of the bumper frame 10, wherein the detachable storage container 23 is detachably coupled at the bottom surface of the bumper frame 10.

For the two drawer storage containers 22, the second and third storage spaces 11E, 11F are formed at the left frame portion 102 and the right frame portion 103 of the bumper frame 10 respectively, wherein the drawer openings are formed at the front surfaces of the right frame portion 103 and the left frame portion 102 the bumper frame 10 respectively, such that the drawer compartments 112 are rearwardly indented from the front surfaces 123 of the right frame portion 103 and the left frame portion 102 the bumper frame 10 respectively. The drawer storage containers 22 are slidably received in the drawer compartments 112 through the drawer opening, such that the drawer storage containers 22 are able to frontwardly slide in-and-out at the third and fourth storage spaces 11E, 11F respectively.

For the two flip type storage containers 21, the fourth and fifth storage spaces 11G, 11H are formed at the right frame portion 103 and the left frame portion 102 of the bumper frame 10 respectively. Each of the storage spaces 11G, 11H is constructed to have the storage compartments and the compartment openings formed at the top surfaces of the right frame portion 103 and the left frame portion 102 the bumper frame 10 respectively, wherein the cover panel 211 of the function unit 20 is pivotally coupled at the compartment opening thereof to selectively enclose the storage compartment. It is worth mentioning that the compartment opening is the top opening, wherein the storage compartment is downwardly indented from the top surface of each of the right frame portion 103 and the left frame portion 102 of the bumper frame 10 to form the storage compartment.

It is worth mentioning that the bumper frame 10 serves as a front bumper of the vehicle, as shown in FIG. 15A, when the bumper frame 10 is detachably coupled at the front end of the vehicle. Likewise, the bumper frame 10 serves as a rear bumper of the vehicle, as shown in FIG. 15B, when the bumper frame 10 is detachably coupled at the rear end of the vehicle.

Figure 16:
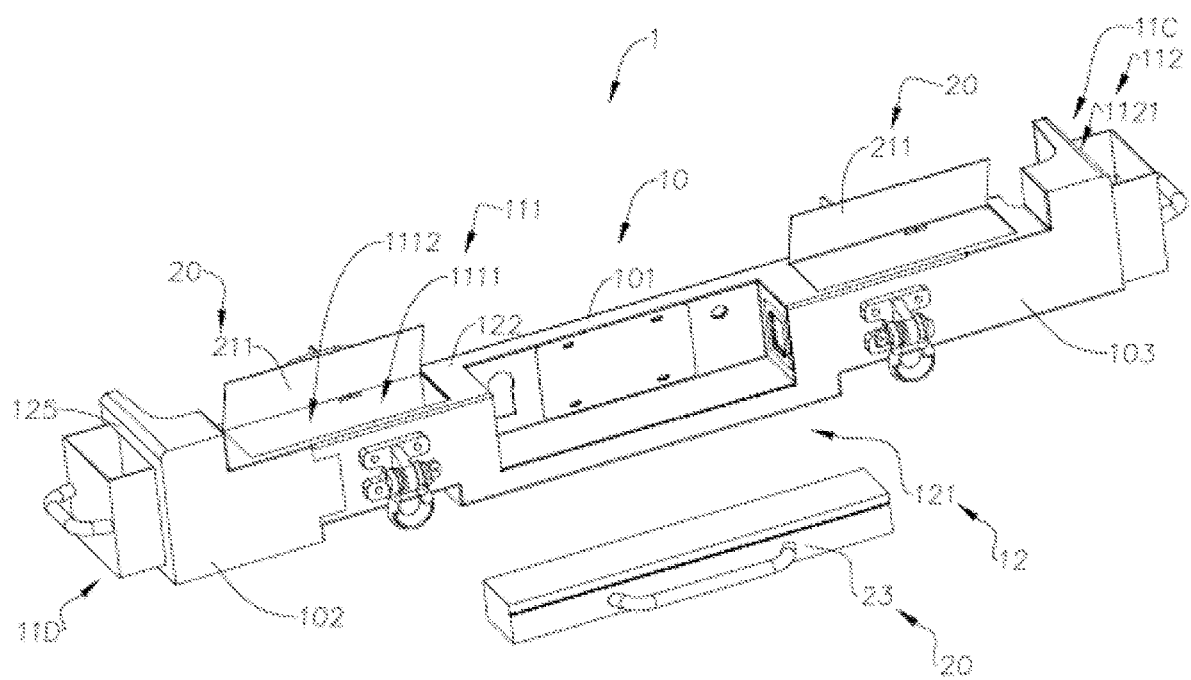
FIG. 16 is a perspective view of the vehicle bumper according to the preferred embodiment of the present invention, illustrating an eleventh combination of the bumper frame and the function unit.

FIG. 16 illustrates an eleventh combination of the bumper frame 10 and the function unit 20. The function unit 20 is constructed to have two flip type storage containers 21, two drawer storage container 22 and one detachable storage container 23.

For the two flip type storage containers 21, the first and second storage spaces 11 are formed at the left frame portion 102 and the right frame portion 103 of the bumper frame 10 respectively, wherein each of the storage spaces 11 is constructed to have the storage compartment 1111 and the compartment opening 1112 of the storage unit 111. The cover panel 211 of the function unit 20 is coupled at each of the storage units 111 at the compartment opening 1112 thereof to selectively enclose the storage compartment 1111. It is worth mentioning that each of the compartment openings 1112 is the top opening, wherein the storage units 111 are downwardly indented from the top surfaces 122 of the left frame portion 102 and the right frame portion 103 of the bumper frame 10 to form the storage compartments 1111. Particularly, the first storage space 11A is formed at the top surface 122 of the mid-frame portion 101 of the bumper frame 10, wherein the storage unit 111 is downwardly indented from the top surface 122 of the mid-frame portion 101 of the bumper frame 10 to form the storage compartment 1111. The cover panel 211 is pivotally coupled at the storage unit 111 at the compartment opening 1112 to selectively open and close the storage compartment 1111.

For the two drawer storage container 22, the third and fourth storage spaces 11C, 11D are formed at the right frame portion 103 and the left frame portion 102 of the bumper frame 10 respectively. Each of the storage spaces 11C, 11D is constructed to have the drawer compartment 112 with the drawer opening 1121 of the storage unit 111, wherein the drawer openings 1121 are formed at two side surfaces 125 of the right frame portion 103 and the left frame portion 102 the bumper frame 10 respectively, such that the drawer compartments 112 are inwardly indented from the side surfaces 125 of the right frame portion 103 and the left frame portion 102 the bumper frame 10 respectively. The drawer storage container 22 is slidably received in each of the drawer compartments 112 through the drawer opening 1121, such that the drawer storage containers 22 are able to sidewardly slide in-and-out at the drawer compartments 112 through the drawer openings 1121 respectively.

For the detachable storage container 23, the bumper body 12 is formed as the mid-frame portion 101 of the bumper frame 10, wherein the installation portion 121 is defined at the bottom surface of the bumper frame 10. The detachable storage container 23 is detachably coupled at the bottom surface of the bumper frame 10 at the installation portion 121 thereof.

Figure 17:
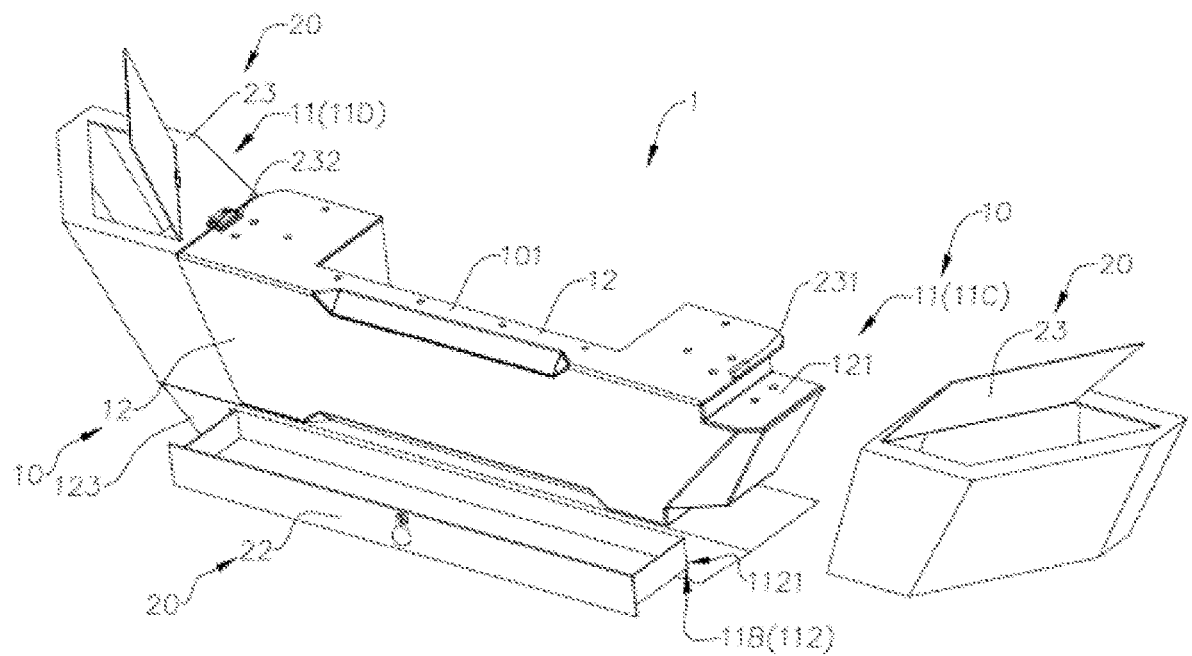
FIG. 17 is a perspective view of the vehicle bumper according to the preferred embodiment of the present invention, illustrating a twentieth combination of the bumper frame and the function unit.

FIG. 17 illustrates a twentieth combination of the bumper frame 10 and the function unit 20. The function unit 20 is constructed to have one drawer storage container 22 and two detachable storage containers 23.

For the drawer storage container 22, the first storage space 11B is formed at the mid-frame portion 101 of the bumper frame 10 and is constructed to have the drawer compartment 112 with the drawer opening 1121, wherein the drawer opening 1121 is formed at the front surface 123 of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. Particularly, the first storage space 11B is formed at the front surface 123 of the mid-frame portion 101 of the bumper frame 10, wherein the drawer compartment 112 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For the two detachable storage containers 23, the second and third storage spaces 11C, 11D are formed the installation portions 121 which are the left frame portion 102 and the right frame portion 103 of the bumper frame 10 respectively. The bumper body 12 has two installation portions 121 are defined at two side ends of the bumper body 12. Two detachable storage containers 23 are detachably coupled at two side ends of the bumper body 12 at the installation portions 121 thereof respectively, such that the detachable storage containers 23 form the right frame portion 103 and the left frame portion 102 of the bumper frame 10 respectively. The first quick releasable locker 231 is provided at the bumper body 12 and the second quick releasable locker 232 is provided at the detachable storage container 23, wherein when the second quick releasable locker 232 is releasably locked with the first quick releasable locker 231, the detachable storage container 23 is locked at installation portion 121 of the bumper body 12.

Figure 18:
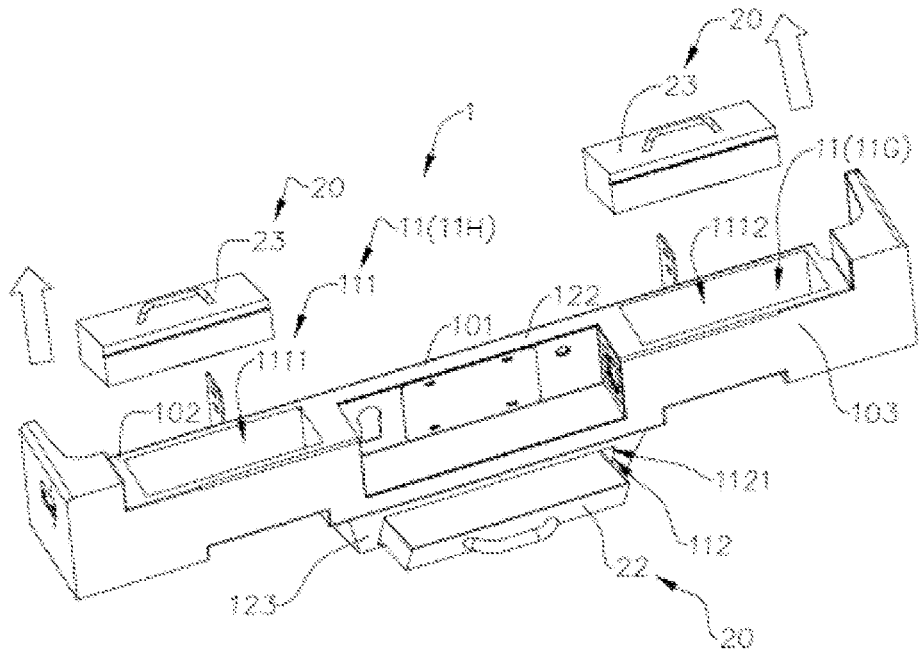
FIG. 18 is a perspective view of the vehicle bumper according to the preferred embodiment of the present invention, illustrating a thirteenth combination of the bumper frame and the function unit.

FIG. 18 illustrates a thirteenth combination of the bumper frame 10 and the function unit 20. The function unit 20 is constructed to have one drawer storage container 22 and two detachable storage containers 23.

For the drawer storage container 22, the drawer compartment 112 is formed at the mid-frame portion 101 of the bumper frame 10, wherein the drawer opening 1121 is formed at the front surface 123 of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121. Particularly, the first storage space 11B is formed at the front surface 123 of the mid-frame portion 101 of the bumper frame 10, wherein the drawer compartment 112 is rearwardly indented from the front surface 123 of the mid-frame portion 101 of the bumper frame 10 to form the drawer compartment 112. In other words, the drawer opening 1121 is formed at the front surface 123 of the bumper frame 10, such that the drawer compartment 112 is rearwardly indented from the front surface 123 of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For the two detachable storage containers 23, two storage spaces 11G, 11H are further formed at the right frame portion 103 and the left frame portion 102 of the bumper frame 10 respectively. Each of the storage spaces 11G, 11H is constructed to have the storage compartment 1111 and the compartment opening 1112 of the storage unit 111, wherein the compartment opening 1112 is the top opening, wherein the storage unit 111 is downwardly indented from the top surface 122 of each of the right frame portion 103 and the left frame portion 102 of the bumper frame 10 to form the storage compartment 1111. The two detachable storage containers 23 are detachably received at the storage compartments 1111 of the storage units 111 through the compartment openings 1112, such that the detachable storage containers 23 are detachably received at the right frame portion 103 and the left frame portion 102 of the bumper frame 10 respectively.

Figures 19A, 19B:
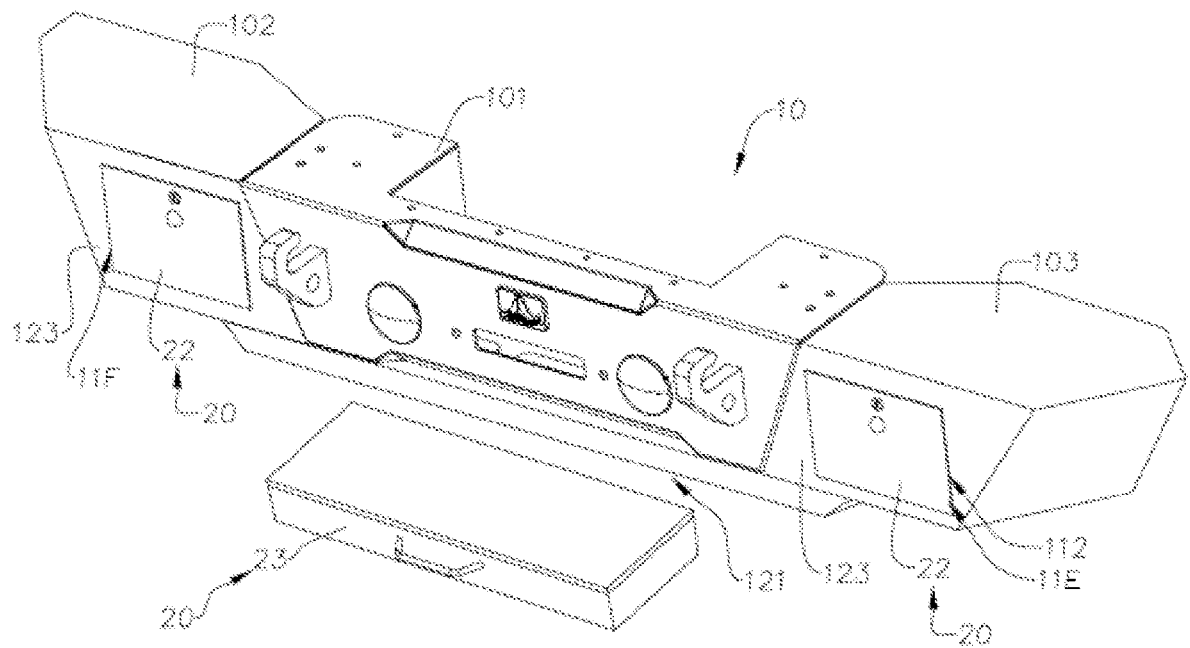
FIGS. 19A and 19B are perspective views of the vehicle bumper according to the preferred embodiment of the present invention, illustrating a fourteenth combination of the storage unit.

FIGS. 19A and 19B illustrate a fourteenth combination of the bumper frame 10 and the function unit 20. The function unit 20 is constructed to have two drawer storage containers 22 and one detachable storage container 23.

For the two drawer storage containers 22, the first and second storage spaces 11E, 11F are formed at the left frame portion 102 and the right frame portion 103 of the bumper frame 10 respectively, wherein the drawer openings are formed at the front surfaces 123 of the right frame portion 103 and the left frame portion 102 the bumper frame 10 respectively, such that the drawer compartments 112 are rearwardly indented from the front surfaces 123 of the right frame portion 103 and the left frame portion 102 the bumper frame 10 respectively. The drawer storage containers 22 are slidably received in the drawer compartments 112 through the drawer opening, such that the drawer storage containers 22 are able to frontwardly slide in-and-out at the third and fourth storage spaces 11E, 11F respectively. It is worth mentioning that the bumper frame 10 serves as a front bumper, as shown in FIG. 19A, wherein the drawer compartments 112 are rearwardly indented from the front surfaces 123 of the right frame portion 103 and the left frame portion 102 the bumper frame 10 respectively. Likewise, the bumper frame 10 serves as a rear bumper, as shown in FIG. 19B, wherein the drawer compartments 112 are frontwardly indented from the rear surfaces 122 of the right frame portion 103 and the left frame portion 102 the bumper frame 10 respectively.

For the detachable storage container 23, the bumper body 12 is formed as the mid-frame portion 101 of the bumper frame 10, wherein the installation portion 121 is defined at the bottom surface of the bumper frame 10. The detachable storage container 23 is detachably coupled at the bottom surface of the bumper frame 10 at the installation portion 121 thereof.

Figure 20A:
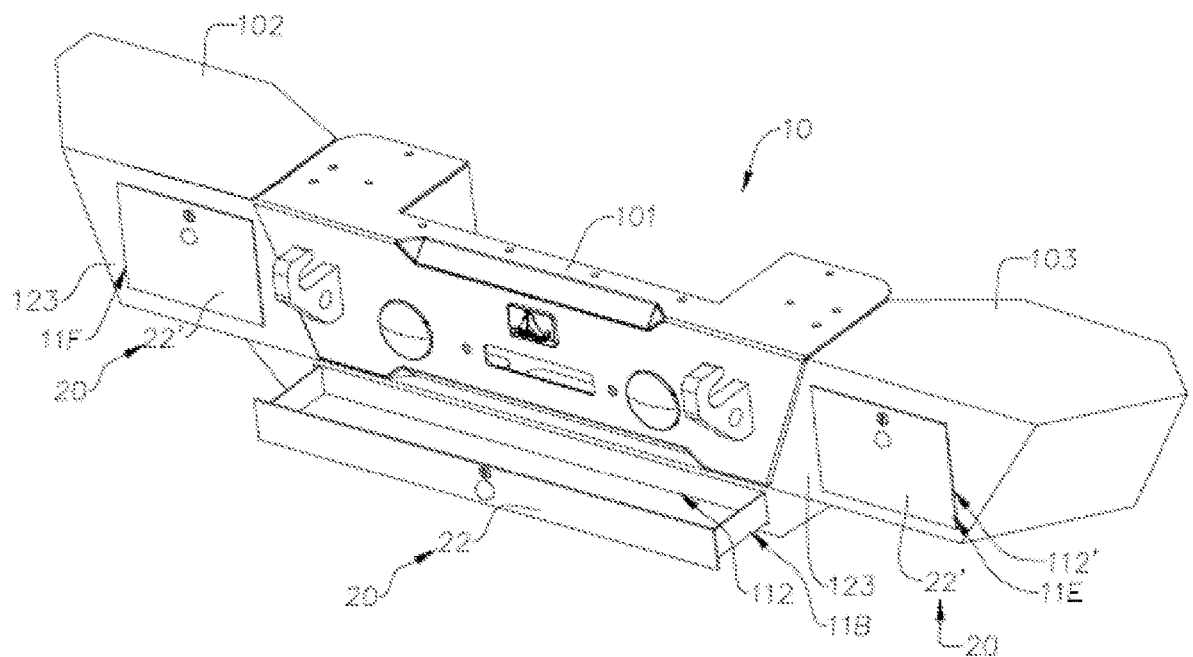
FIGS. 20A and 20B are perspective views of the vehicle bumper according to the preferred embodiment of the present invention, illustrating a fifteenth combination of the storage unit.
Figure 20B:
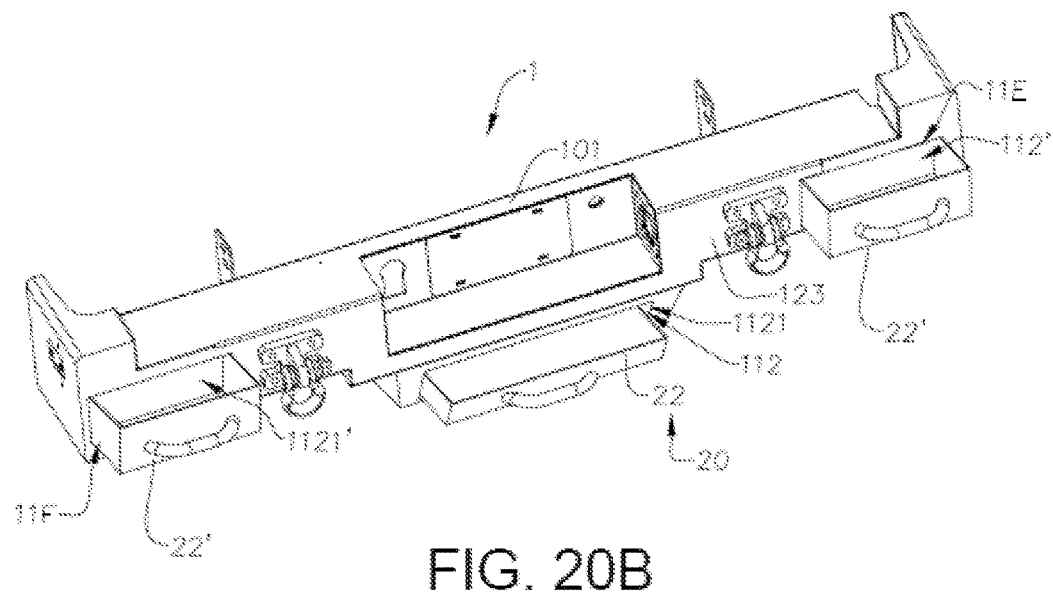

FIGS. 20A and 20B illustrate a fifteenth combination of the bumper frame 10 and the function unit 20. The function unit 20 is constructed to have three drawer storage containers 22.

For one of the three drawer storage containers 22, the drawer compartment 112 is formed at the mid-frame portion 101 of the bumper frame 10, wherein the drawer opening 1121 is formed at the front surface 123 of the bumper frame 10, such that the drawer compartment 112 is rearwardly indented from the front surface of the bumper frame 10. The drawer storage container 22 is slidably received in the drawer compartment 112 through the drawer opening 1121, such that the drawer storage container 22 is able to slide in-and-out at the drawer compartment 112 through the drawer opening 1121.

For the other two drawer storage containers 22', the first and second storage spaces 11E, 11F are formed at the left frame portion 102 and the right frame portion 103 of the bumper frame 10 respectively, wherein the drawer openings are formed at the front surfaces 123 of the right frame portion 103 and the left frame portion 102 the bumper frame 10 respectively, such that the drawer compartments 112' are rearwardly indented from the front surfaces 123 of the right frame portion 103 and the left frame portion 102 the bumper frame 10 respectively. The drawer storage containers 22' are slidably received in the drawer compartments 112 through the drawer opening, such that the drawer storage containers 22' are able to frontwardly slide in-and-out at the third and fourth storage spaces 11E, 11F respectively.

Figure 21:
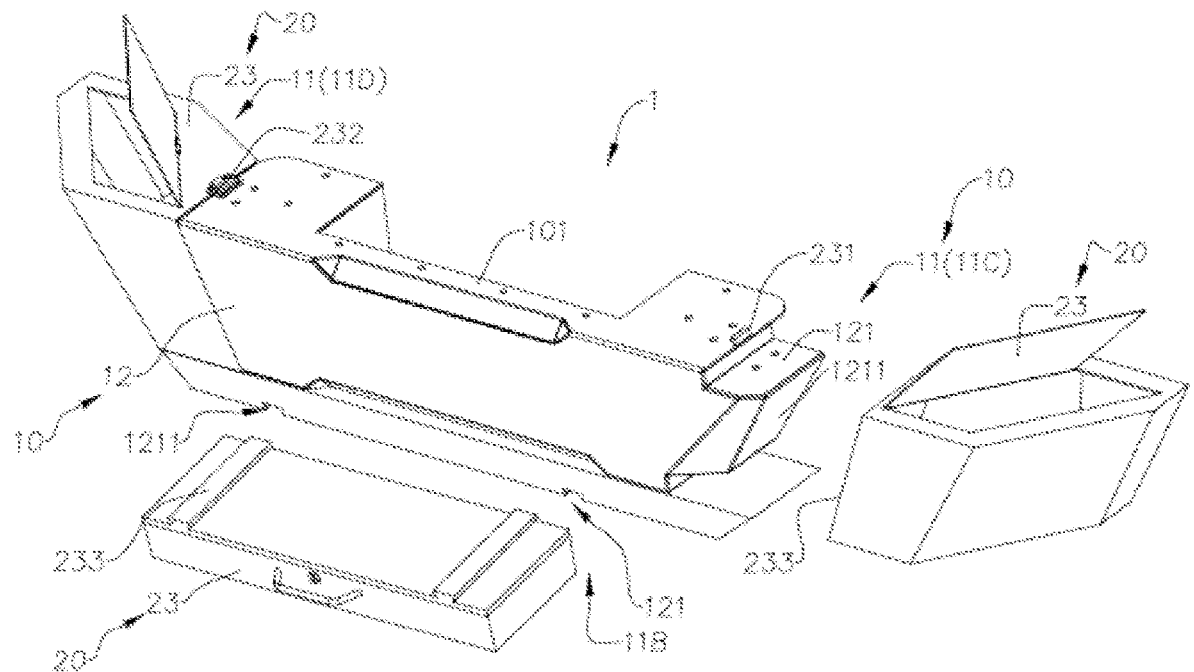
FIG. 21 is a perspective view of the vehicle bumper according to the preferred embodiment of the present invention, illustrating a sixteenth combination of the storage unit.

FIG. 21 illustrates a sixteenth combination of the bumper frame 10 and the function unit 20. The function unit 20 is constructed to have three detachable storage containers 23.

For one of the three detachable storage containers 23, the detachable storage container 23 is detachably coupled at the bottom surface of the bumper body 12 of the bumper frame 10. The positioning devices 1211 are formed at the bottom surface of the bumper frame 10 to detachably couple with the coupling devices 233 of the detachable storage container 23. The positioning devices 1211 are embodied as a plurality of guiding slots spacedly indented on the bottom surface of the bumper frame 10, and the coupling devices 233 are embodied as guiding protrusions spacedly protruded from a top surface of the detachable storage container 23 to slidably engage with the guiding slots respectively so as to guide and retain the detachable storage container 23 at the installation portion 121 of the bumper frame 10. Particularly, the guiding protrusions are slidably engaged with the guiding slots to couple the detachable storage container 23 at the bottom surface of the bumper frame 10. The detachable storage container 23 is frontwardly slid to disengage the guiding protrusions with the guiding slots to detach the detachable storage container 23 from the bottom surface of the bumper frame 10.

For the other two detachable storage containers 23, the second and third storage spaces 11C, 11D are formed the installation portions 121 which are two sides of the bumper body 12 of the bumper frame 10 respectively. The bumper body 12 has two installation portions 121 are defined at two side ends of the bumper body 12. Two detachable storage containers 23 are detachably coupled at two side ends of the bumper body 12 at the installation portions 121 thereof respectively. The positioning devices 1211 are formed at the side surfaces of the bumper body 12 at the installation portions 121 to detachably couple with the detachable storage container 23. The first quick releasable locker 231 is provided at the bumper body 12 and the second quick releasable locker 232 is provided at the detachable storage container 23, wherein when the second quick releasable locker 232 is releasably locked with the first quick releasable locker 231, the detachable storage container 23 is locked at installation portion 121 of the bumper body 12.

Figure 22:
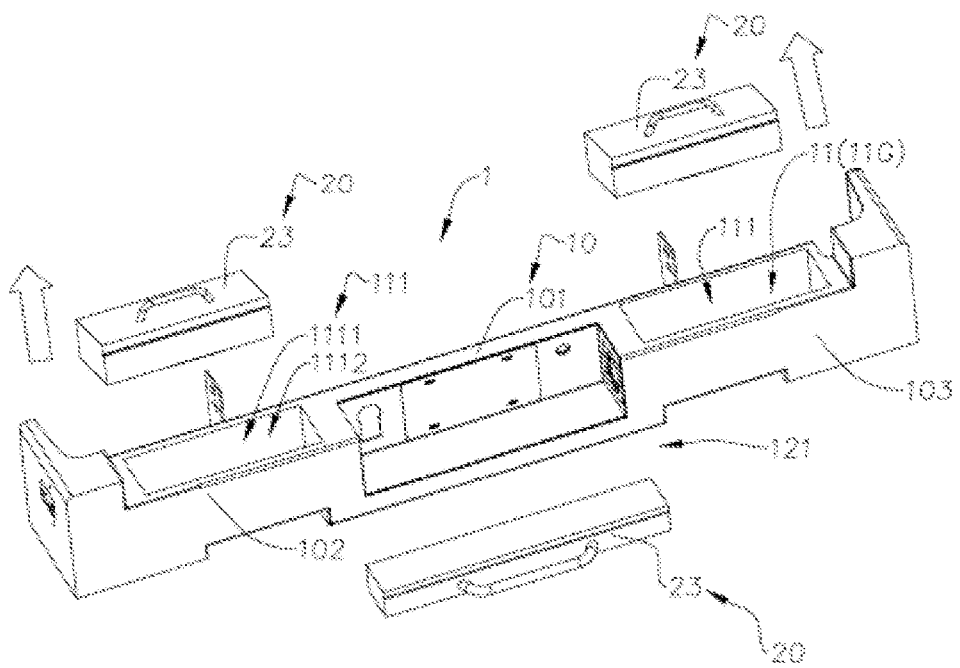
FIG. 22 is a perspective view of the vehicle bumper according to the preferred embodiment of the present invention, illustrating a seventeenth combination of the storage unit.

FIG. 22 illustrates a seventeenth combination of the bumper frame 10 and the function unit 20. The function unit 20 is constructed to have three detachable storage containers 23.

For one of the three detachable storage containers 23, the installation portion 121 is defined at the bottom surface of the bumper frame 10. The detachable storage container 23 is detachably coupled at the bottom surface of the bumper frame 10 at the installation portion 121 thereof.

For the other two detachable storage containers 23, two storage spaces 11G, 11H are further formed at the right frame portion 103 and the left frame portion 102 of the bumper frame 10 respectively. Each of the storage spaces 11G, 11H is constructed to have the storage compartment 1111 and the compartment opening 1112 of the storage unit 111, wherein the compartment opening 1112 is the top opening, wherein the storage unit 111 is downwardly indented from the top surface 122 of each of the right frame portion 103 and the left frame portion 102 of the bumper frame 10 to form the storage compartment 1111. The two detachable storage containers 23 are detachably received at the storage compartments 1111 of the storage units 111 through the compartment openings 1112, such that the detachable storage containers 23 are detachably received at the right frame portion 103 and the left frame portion 102 of the bumper frame 10 respectively.

According to the preferred embodiment, the present invention further provides a method for manufacturing the vehicle bumper, which comprises the following steps.

(A) Provide the bumper frame 10 with at least one storage space 11.

(B) Provide the function unit at the bumper frame 10 to incorporate with the storage space 11.

Accordingly, the storage space 11 is integrally formed with the bumper frame 10.

Accordingly, the storage space 11 is formed at the bumper frame 10 through a secondary processing.

Accordingly, the storage space 11 is constructed by a storage unit 111 formed at the bumper frame 10, wherein the storage unit 111 has a storage compartment 1111 and compartment opening 1112.

Accordingly, the bumper frame 10 can be made of desired materials such as plastic, metal, alloy, etc.

Accordingly, the functional device 20 comprises a cover panel 211 coupled at the storage unit 111 at the compartment opening 1112 to selective open and close the storage compartment 1111.

Accordingly, the storage space 11 is constructed to have a drawer compartment 112 with a drawer opening 1121. The function unit 20 comprises a drawer storage container 22 slidably received in the drawer compartment 112 through the drawer opening 1121, such that the drawer storage container 22 is able to slide in-and-out at the drawer compartment 112 through the drawer opening 1121.

Accordingly, the bumper frame 10 comprises a bumper body 12 and has one or more installation portions 121 formed thereat, wherein the detachable storage container 23 is detachably coupled at the installation portion 121 of the bumper body 12 to form the bumper frame 10.

Accordingly, the storage space 11 can be formed at a top surface, bottom surface, front surface, rear surface, or side surface of the bumper body 12.

According to the preferred embodiment, the present invention further provides a method for installing the vehicle bumper to the vehicle, which comprises the following steps.

(a) Confirm whether it is necessary to remove an original vehicle bumper from the vehicle, if necessary, proceed to step (b), otherwise, proceed to step (c).

(b) Loosen all bumper connectors from the original vehicle bumper to detach the original vehicle bumper from the front end or the rear end of the vehicle.

(c) Attach the vehicle bumper 1 of the present invention to the front end or the rear end of the vehicle by fastening the bumper connectors to the vehicle bumper 1 of the present invention at the vehicle. It is worth mentioning that the vehicle bumper 1 of the present invention can be directly coupled to the original vehicle bumper, such that the original vehicle bumper is not required for being detached from the vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle bumper for a vehicle, comprising:
    a bumper frame adapted for installing into one of a front end and a rear end of a vehicle to absorb impact in case of collision, wherein said bumper frame has a left frame portion, a right frame portion, a mid-frame portion, and at least one storage space formed with at least one of said left frame portion, said right frame portion and said mid-frame portion to provide a storage of said bumper frame; and
    at least one function unit provided at said bumper frame and incorporated with said at least one storage space to form a storage container for providing an additional storage to the vehicle, wherein at least one of said at least one storage space is defined at a bottom surface of said mid-frame portion of said bumper frame, wherein said storage container serves as a detachable storage container detachably coupled at said bottom surface of said mid-frame portion of said bumper frame, wherein said at least one function unit further comprises a plurality of guiding slots formed at said bottom surface of said mid-frame portion of said bumper frame and a plurality of guiding protrusions formed at a top surface of said detachable storage container to slidably engage with said guiding slots so as to guide and retain said detachable storage container at said bottom surface of said mid-frame portion of said bumper frame.

2. A vehicle bumper for a vehicle, comprising:
    a bumper frame adapted for installing into one of a front end and a rear end of a vehicle to absorb impact in case of collision, wherein said bumper frame has a left frame portion, a right frame portion, a mid-frame portion, and at least one storage space formed with at least one of said left frame portion, said right frame portion and said mid-frame portion to provide a storage of said bumper frame; and
    at least one function unit provided at said bumper frame and incorporated with said at least one storage space to form a storage container for providing an additional storage to the vehicle, wherein at least one of said at least one storage space is defined at each of said left frame portion and said right frame portion of said bumper frame, wherein said storage container serves as two detachable storage containers detachably coupled at said left frame portion and said right frame portion of said bumper frame respectively, wherein at least one of said detachable storage containers serves as a liquid container which comprises a sealing container, a liquid inlet and a liquid outlet.

3. A vehicle bumper for a vehicle, comprising:
    a bumper frame adapted for installing into one of a front end and a rear end of a vehicle to absorb impact in case of collision, wherein said bumper frame has a left frame portion, a right frame portion, a mid-frame portion, and at least one storage space formed with at least one of said left frame portion, said right frame portion and said mid-frame portion to provide a storage of said bumper frame; and
    at least one function unit provided at said bumper frame and incorporated with said at least one storage space to form a storage container for providing an additional storage to the vehicle, wherein said function unit is incorporated with said storage space to form at least one flip type storage container and at least one drawer storage container, wherein said flip type storage container and said drawer storage container are located at different locations of said bumper frame, such that said flip type storage container and said drawer storage container are individually operated, wherein said flip type storage container and said drawer storage container are located at said mid-frame portion of said bumper frame at a position that said flip type storage container is positioned above said drawer storage container.

4. A vehicle bumper for a vehicle, comprising:
    a bumper frame adapted for installing into one of a front end and a rear end of a vehicle to absorb impact in case of collision, wherein said bumper frame has a left frame portion, a right frame portion, a mid-frame portion, and at least one storage space formed with at least one of said left frame portion, said right frame portion and said mid-frame portion to provide a storage of said bumper frame; and
    at least one function unit provided at said bumper frame and incorporated with said at least one storage space to form a storage container for providing an additional storage to the vehicle, wherein said function unit is incorporated with said storage space to form at least one flip type storage container and at least one detachable storage container, wherein said flip type storage container and said detachable storage container are located at different locations of said bumper frame, such that said flip type storage container and said detachable storage container are individually operated, wherein said flip type storage container and said detachable storage container are located at said mid-frame portion of said bumper frame at a position that said flip type storage container is positioned above said detachable storage container.

5. A vehicle bumper for a vehicle, comprising:

a bumper frame adapted for installing into one of a front end and a rear end of a vehicle to absorb impact in case of collision, wherein said bumper frame has a left frame portion, a right frame portion, a mid-frame portion, and at least one storage space formed with at least one of said left frame portion, said right frame portion and said mid-frame portion to provide a storage of said bumper frame;

at least one function unit provided at said bumper frame and incorporated with said at least one storage space to form a storage container for providing an additional storage to the vehicle, wherein said function unit is incorporated with said storage space to form at least one flip type storage container, at least one drawer storage container and at least one detachable storage container, wherein said flip type storage container, said drawer storage container and said detachable storage container are located at different locations of said bumper frame, such that said flip type storage container, said drawer storage container and said detachable storage container are individually operated; and at least a light module provided at a top surface of said mid-frame portion of said bumper frame.

* * * * *